(12) United States Patent
Smith et al.

(10) Patent No.: US 6,688,132 B2
(45) Date of Patent: Feb. 10, 2004

(54) COOLING DEVICE AND TEMPERATURE-CONTROLLED SHIPPING CONTAINER USING SAME

(75) Inventors: Douglas M. Smith, Albuquerque, NM (US); Kevin H. Roderick, Albuquerque, NM (US); Richard G. Perkes, Stewkley (GB); Vanessa Sinclair, Leighton Buzzard (GB); Lois X. Warren, Bernalillo, NM (US)

(73) Assignee: Nanopore, Inc., Albuquerque, NM (US)

( * ) Notice: Subject to any disclaimer, the term of this patent is extended or adjusted under 35 U.S.C. 154(b) by 24 days.

(21) Appl. No.: 09/970,094

(22) Filed: Oct. 2, 2001

(65) Prior Publication Data

US 2003/0014993 A1 Jan. 23, 2003

Related U.S. Application Data

(63) Continuation-in-part of application No. 09/876,841, filed on Jun. 6, 2001.

(51) Int. Cl.[7] .............................. F25D 3/98; F28D 15/00
(52) U.S. Cl. .................... 62/371; 165/104.21; 62/457.9; 62/480
(58) Field of Search ................................ 62/371, 457.9, 62/457.7, 238.1, 238.3, 494, 476, 480, 101, 109; 165/104.21

(56) References Cited

U.S. PATENT DOCUMENTS

| | | | |
|---|---|---|---|
| 2,088,276 A | * 7/1937 | Nesselmann et al. | 62/480 |
| 4,048,810 A | 9/1977 | Zeilon | 62/101 |
| 4,205,531 A | 6/1980 | Brunberg et al. | 62/101 |
| 4,250,720 A | 2/1981 | Siegel | 62/480 |
| 4,635,629 A | 1/1987 | Thorp et al. | 128/202.26 |
| 4,736,599 A | 4/1988 | Siegel | 62/294 |
| 4,742,868 A | 5/1988 | Mitani et al. | 165/104.12 |
| 4,752,310 A | 6/1988 | Maier-Laxhuber et al. | 62/4 |
| 4,759,191 A | 7/1988 | Thomas et al. | 62/101 |

(List continued on next page.)

FOREIGN PATENT DOCUMENTS

| | | | |
|---|---|---|---|
| DE | 4207857 A1 | * | 9/1993 |
| GB | 2095386 | | 9/1982 |

OTHER PUBLICATIONS

Pending Patent Application Ser. No. 09/876,841; Entitled "Temperature–Controlled Shipping Container and Method for Using Same"; Smith et al.; filed on Jun. 6, 2001.

Pending Patent Application Ser. No. 09/932,264; Entitled "Cooling Device"; Smith et al.; filed Aug. 17, 2001.

Pending Patent Application Ser. No. 10/046,661; Entitled "Cooling Device"; Roderick; filed on Oct. 26, 2001.

Pending Patent Application Ser. No. 10/165,753; Entitled "Temperature Controlled Shipping Containers"; Smith et al; filed on Jun. 6, 2002.

Pending Patent Application Ser. No. 10/165,758; Entitled "Sorption Cooling Device and Temperature–Controlled Shipping Containers Incorporating Sorption Cooling Devices"; Smith et al.; filed on Jun. 6, 2002.

Pending Patent Application Ser. No. 09/691,371; Entitled Desiccant Composition:; Smith et al.; filed on Oct. 18, 2000.

*Primary Examiner*—Chen Wen Jiang
(74) *Attorney, Agent, or Firm*—Marsh Fischmann & Breyfogle LLP

(57) ABSTRACT

A sorption cooling device capable of providing cooling over an extended period of time. Theسsorption cooling device is particularly useful in a temperature-controlled shipping container that is required to maintain a temperature below ambient for an extended period of time. In one embodiment, the cooling device includes a means for restricting the flow of refrigerant liquid to control the degree of cooling over an extended period of time.

13 Claims, 20 Drawing Sheets

U.S. PATENT DOCUMENTS

| | | | |
|---|---|---|---|
| 4,928,495 A | 5/1990 | Siegel | 62/4 |
| 5,038,581 A | 8/1991 | Maier-Laxhuber et al. | 62/457.9 |
| 5,048,301 A | 9/1991 | Sabin et al. | 62/101 |
| 5,088,302 A | 2/1992 | Tomizawa et al. | 62/480 |
| 5,111,668 A | 5/1992 | Parrish et al. | 62/259.3 |
| 5,113,666 A | 5/1992 | Parrish et al. | 62/259.3 |
| 5,186,020 A | 2/1993 | Rockenfeller et al. | 62/457.9 |
| 5,269,293 A | 12/1993 | Loser et al. | 128/204.15 |
| 5,289,695 A | 3/1994 | Parrish et al. | 62/259.3 |
| 5,291,750 A | 3/1994 | Parrish et al. | 62/259.3 |
| 5,291,942 A | 3/1994 | Ryan | 165/104.12 |
| 5,309,985 A | 5/1994 | Erickson | 165/104.12 |
| 5,355,684 A | 10/1994 | Guice | 62/54.2 |
| 5,440,896 A | 8/1995 | Maier-Laxhuber et al. | 62/269 |
| 5,628,205 A | 5/1997 | Rockenfeller et al. | 62/480 |
| 5,660,049 A | 8/1997 | Erickson | 62/107 |
| 5,802,870 A | 9/1998 | Arnold et al. | 62/480 |
| 5,816,069 A | 10/1998 | Ebbeson | 62/457.9 |
| 5,924,302 A | 7/1999 | Derifield | 62/457.2 |
| 5,943,876 A | 8/1999 | Meyer et al. | 62/371 |
| 5,950,450 A | 9/1999 | Meyer et al. | 62/457.9 |
| 6,105,382 A | 8/2000 | Reason | 62/259.3 |
| 6,192,703 B1 | 2/2001 | Salyer et al. | 62/457.7 |
| 6,438,992 B1 | 8/2002 | Smith et al. | 62/480 |
| 6,474,100 B1 | 11/2002 | Smith et al. | 62/480 |

\* cited by examiner

COOLING DEVICE AND TEMPERATURE-CONTROLLED SHIPPING CONTAINER USING SAME

CROSS-REFERENCE TO RELATED APPLICATIONS

This application is a continuation-in-part application of U.S. patent application Ser. No. 09/876,841 filed on Jun. 6, 2001, the disclosure of which is incorporated herein by reference in its entirety.

BACKGROUND OF THE INVENTION

1. Field of the Invention

The present invention is directed to improved sorption cooling devices and to temperature-controlled shipping containers incorporating the cooling devices. In particular, the present invention is directed to sorption cooling devices that are adapted to maintain a reduced temperature within an enclosed container for an extended period of time. The devices are particularly useful for temperature-controlled shipping containers that must maintain a temperature below ambient for extended time periods such as 24 to 72 hours.

2. Description of Related Art

The shipment of products that must have their temperature maintained within a specific range below ambient is one of the fastest growing market segments in the modern shipping industry. This growth is driven by a number of factors including widespread concerns about safety in the cold food distribution chain, increasing numbers of pharmaceutical and life sciences products which must have their temperature maintained within certain limits, the rapid growth in high-value specialty chemicals such as those used in the semiconductor industry, the increasing number of sophisticated medical tests which require the shipment of patient specimens to an external laboratory, the increased number of clinical trials associated with new pharmaceutical discovery and the increased delivery of products directly to the customer as a result of Internet ordering.

This field is generally referred to as controlled temperature packaging (CTP). CTP can be segmented by the target temperature range, namely: frozen (below 0° C.); 2° to 8° C., and less than ambient (e.g., less than 30° C.). In addition, CTP may be segmented by container size, namely: greater than pallet; one cubic foot to pallet; and less than one cubic foot. Containers having a size greater than pallet are typically cooled by mechanical refrigeration and the shipment times are typically from days to many weeks. The one cubic foot to pallet size segment is dominated by systems using ice (e.g., gel packs) and/or dry ice as a coolant wherein the containers are insulated using expanded polystyrene (EPS). The market segment for containers less than one cubic foot in size is very limited due to an unmet need for a small, lightweight cooling mechanism.

Although many basic ice/EPS systems are in use, there is a wide variation in quality and performance of the packaging depending on the value of the product and the sensitivity of the product to temperature fluctuation. A relatively simple system includes a cardboard box into which EPS sheet has been cut and placed. The container is then filled with dry ice in which, for example, frozen fish is shipped. A more sophisticated approach is a validated system consisting of custom molded EPS forms in a rigid box with both frozen and warm gel packs, the combination of which has been tested through a range of temperature cycles for specified thermal properties. Such a validated system can be used for shipping pharmaceuticals. For example, many pharmaceutical products such as vaccines and antibodies must be maintained at 2° C. to 8° C.

The existing ice/EPS cooling system is unsatisfactory because of increased environmental concerns associated with disposal of large quantities of EPS and gel packs with the high cost of shipping. Gel packs also require freezers at the shipping source to maintain the frozen packs. The high cost of shipping is directly related to the high volume associated with the EPS and the high volume and mass associated with the gel packs. As an example, for a one cubic foot box with a 60 hour lifetime at 2° C. to 8° C., over 90 percent of the volume is consumed by EPS and gel packs. Some reduction in volume and shipping costs may be obtained by using vacuum insulation panels (VIPS), but the high cost of VIPs has precluded significant market penetration.

An example of the foregoing system is illustrated in U.S. Pat. No. 5,924,302 by Derifield issued on Jul. 20, 1999. This patent illustrates a shipping container that includes a plurality of cavities adapted to receive a coolant (e.g., gel packs) that surround a cavity adapted to receive an item to be shipped.

Electrically cooled shipping containers are also known, as illustrated in U.S. Pat. No. 6,192,703 by Salyer et al. issued on Feb. 27, 2001. This patent discloses a portable refrigerator unit and storage container employing vacuum insulation panels and a phase change material. Phase change materials undergo a change in physical form (e.g., solid to liquid) thereby absorbing heat from the surrounding environment. A battery driven refrigeration system provides cooling of the shipping container.

There is a need for a temperature-controlled container, such as a shipping container, having a lightweight cooling mechanism that does not occupy a large volume. It would be advantageous if the temperature of the container was controllable over a range of temperatures. It would also be advantageous if the cooling mechanism had the ability to maintain the reduced temperature for an extended period of time.

SUMMARY OF THE INVENTION

The present invention is generally directed to sorption cooling devices. The sorption cooling devices are particularly useful for controlled temperature shipping containers.

According to one embodiment of the present invention, a sorption cooling device is provided. The sorption cooling device includes an evaporator, an absorber, at least a first reservoir adapted to contain a liquid and a liquid disposed in the first reservoir. Flow restriction means is disposed between the liquid and the evaporator for restricting the flow of the liquid to the evaporator, thereby providing cooling at a controlled rate.

According to another embodiment of the present invention, a sorption cooling device is provided that includes an evaporator, an absorber, at least a first reservoir adapted to contain a first liquid and at least a second reservoir adapted to contain a second liquid. Means for supplying liquid from the first and second reservoirs to the evaporator is also provided wherein the first reservoir supplies liquid to the evaporator at a rate faster than the liquid supply rate from the second reservoir. For example, flow restriction means can be disposed between the liquid and the evaporator for restricting the flow of the liquid from the second reservoir to the evaporator.

According to another embodiment of the present invention, a method is provided for operating a sorption cooling device having an evaporator for providing cooling and an absorber for absorbing vapor formed in the evaporator. A first portion of liquid is supplied to the evaporator at a first liquid supply rate and a second portion of liquid is supplied to the evaporator at a second liquid supply rate that is lower than the first liquid supply rate. This method advantageously enables rapid initial cooling and subsequent controlled maintenance of the cooling over an extended period of time.

According to another embodiment, a sorption cooling device is provided that includes an evaporator, an absorber and a vapor conduit connecting the evaporator and the absorber. The vapor conduit comprises a thermally insulating material such as an open cell foam to reduce the heat transfer between the evaporator and absorber while permitting vapor flow therethrough.

According to yet another embodiment, a sorption cooling device is provided that includes an absorber, an evaporator and a reservoir adapted to supply a liquid to the evaporator. A freezing point suppression agent is dispersed within the evaporator to reduce freezing of the liquid in the evaporator.

DESCRIPTION OF THE INVENTION

The present invention is directed to sorption cooling devices and to containers such as shipping containers wherein the temperature of the internal cavity of the container is controlled utilizing a sorption cooling device.

The fundamental operation of a sorption cooling device is well known. The boiling point of a liquid can be lowered by reducing the pressure over the liquid, such as by placing the liquid in a vacuum. A liquid, for example water, that is under a substantially reduced pressure will boil and absorb heat from the surrounding environment. This absorption of heat creates the desired cooling affect. To prevent the development of high vapor pressure over the boiling liquid, which would stop the boiling of the liquid, the vapor that is generated must be continuously removed and the removal of the vapor must be done without the introduction of outside air. Thus, an absorbent such as a desiccant can be utilized to absorb the vapor and permit the liquid to continue boiling and absorbing heat from the environment. An example of a sorption cooling system is described in U.S. Pat. No. 4,250,720 by Siegel, which is incorporated by herein by reference in its entirety.

Figure 1:
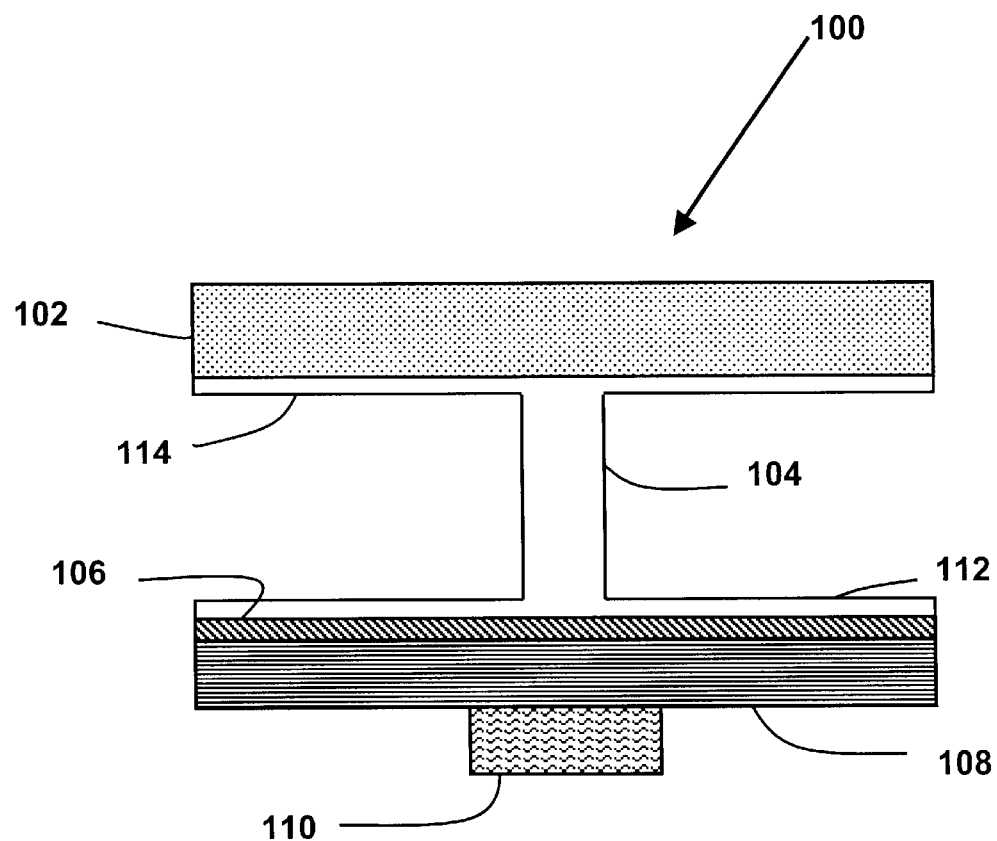
FIG. 1 illustrates a cross-section of a sorption cooling device in accordance with an embodiment of the present invention.
Figure 2:
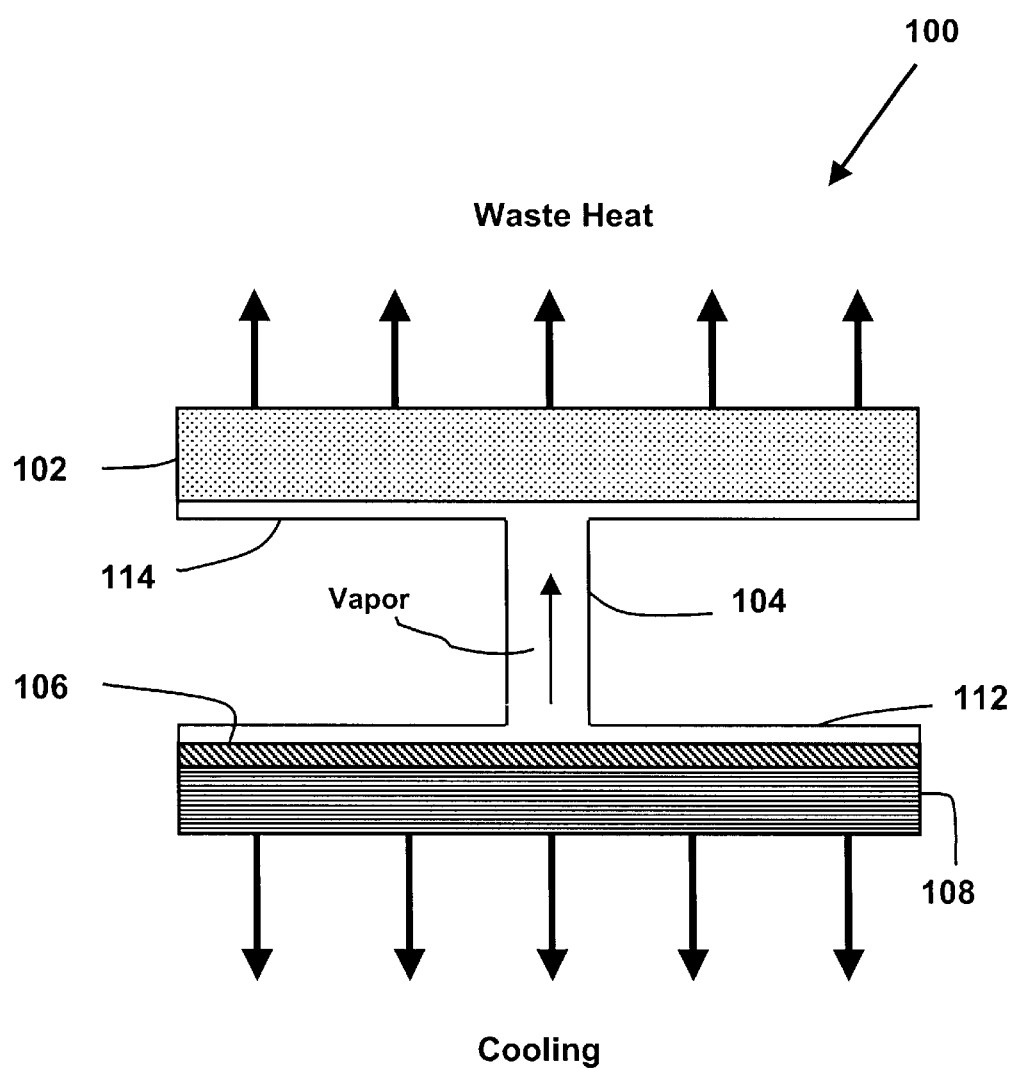
FIG. 2 illustrates a cross-section of a sorption cooling device in accordance with an embodiment of the present invention.

FIGS. 1 and 2 illustrate a cross-sectional view of a sorption cooling device that is useful in accordance with the present invention. The sorption cooling device 100 includes an absorber 102 and an evaporator 108 with a vapor passageway 104 disposed between the evaporator 108 and the absorber 102. A liquid reservoir 110 provides a source of liquid that is delivered to the evaporator 108 upon release of the liquid from the reservoir 110. The liquid evaporates (boils) in the evaporator 108 thereby providing cooling to that side of the device (FIG. 2). The vapor passes through the vapor passageway 104 and is absorbed by a desiccant located within the absorber 102. The desiccant releases heat that is at least equal to the amount of heat removed at the evaporator.

In order for the released liquid to boil, the sorption cooling device 100 is maintained at a reduced pressure and preferably is maintained under a substantial vacuum. More particularly, the pressure within the device is preferably not greater than about 4 mbar (3 torr). To maintain the reduced pressure and to provide an adequate shelf life for the device, the sorption cooling device 100 can be enclosed in an impermeable casing material such as a metallized polyester film to prevent the leakage of gases into the device.

In operation, the liquid reservoir 110, which is separately maintained at near ambient pressure, is activated to release liquid to the evaporator 108. For example, the liquid reservoir 110 can be a simple polymeric pouch that is punctured to release liquid. Alternatively, a valving mechanism can be used to expose the liquid to the reduced pressure of the device. It will be appreciated that the liquid reservoir 110 can be located at virtually any position in relation to the remainder of the sorption cooling device, as long as fluid communication is provided from the reservoir 110 to the evaporator 108. In either case, the liquid is exposed to the evaporator 108 and is thereby exposed to a substantial drop in pressure causing the liquid to vaporize within the evaporator 108.

To provide adequate cooling over a long period of time, there must either be a large quantity of liquid initially present in the evaporator 108 or additional liquid must be added to the evaporator 108 over a period of time. If all of the liquid is stored in the evaporator 108 (e.g., without a separate reservoir), then the entire volume of liquid must be cooled before external cooling can begin. Furthermore, there is a practical limit to the amount of liquid that can be stored in the evaporator 108. It is preferable for these and other reasons to maintain the liquid in a remote location (e.g., reservoir 110) and distribute it to the evaporator 108 in a controlled fashion.

According to one embodiment of the present invention, the flow rate of the liquid (e.g., water) from the reservoir 110 to the evaporator 108 is carefully controlled to regulate the overall cooling rate of the sorption cooling device 100. For applications such as temperature-controlled shipping containers, relatively low cooling power is required. But the cooling must continue for long periods of time, often in excess of 48 hours. In order to provide this cooling rate according to the present invention, a controlled liquid flow rate is maintained into the evaporator 108 over a long time period to maintain a steady level of cooling. Absent proper control, all of the liquid in the reservoir 108 would immediately flow to the evaporator 108 upon release from the reservoir 110. According to the present invention, liquid flow restriction means is used to restrict the liquid flow rate to an appropriate level. The flow restriction means can be any type of partial barrier that permits liquid to flow to the evaporator but causes the flow rate of the liquid to be reduced. Preferably, the reduced flow rate is constant during operation of the device. For example, the flow restriction means can utilize the viscosity of the liquid to reduce the flow rate as it passes through one or more restrictions in order to maintain the proper flow rate. For example, the liquid can be forced to flow through one or more small apertures or pores. The flow rate is thereby controlled by one or more of the liquid viscosity, the diameter and length of the apertures and the pressure drop between both sides of the device, which is typically about one atmosphere.

Accordingly, a porous membrane having a pre-selected volume and pore size can be incorporated into the reservoir 110 that contains the liquid or which contains a pre-sealed pouch of the liquid. Upon actuation, the liquid must flow through the porous membrane in order to travel from the inside of the pouch to the evaporator 108. The pore size and thickness of the membrane can be selected to provide the desired liquid flow rate based upon the cooling rate that is required for the application. According to one embodiment, the membrane has an average pore size of from about 0.05 $\mu$m to about 20 $\mu$m.

Figure 3:
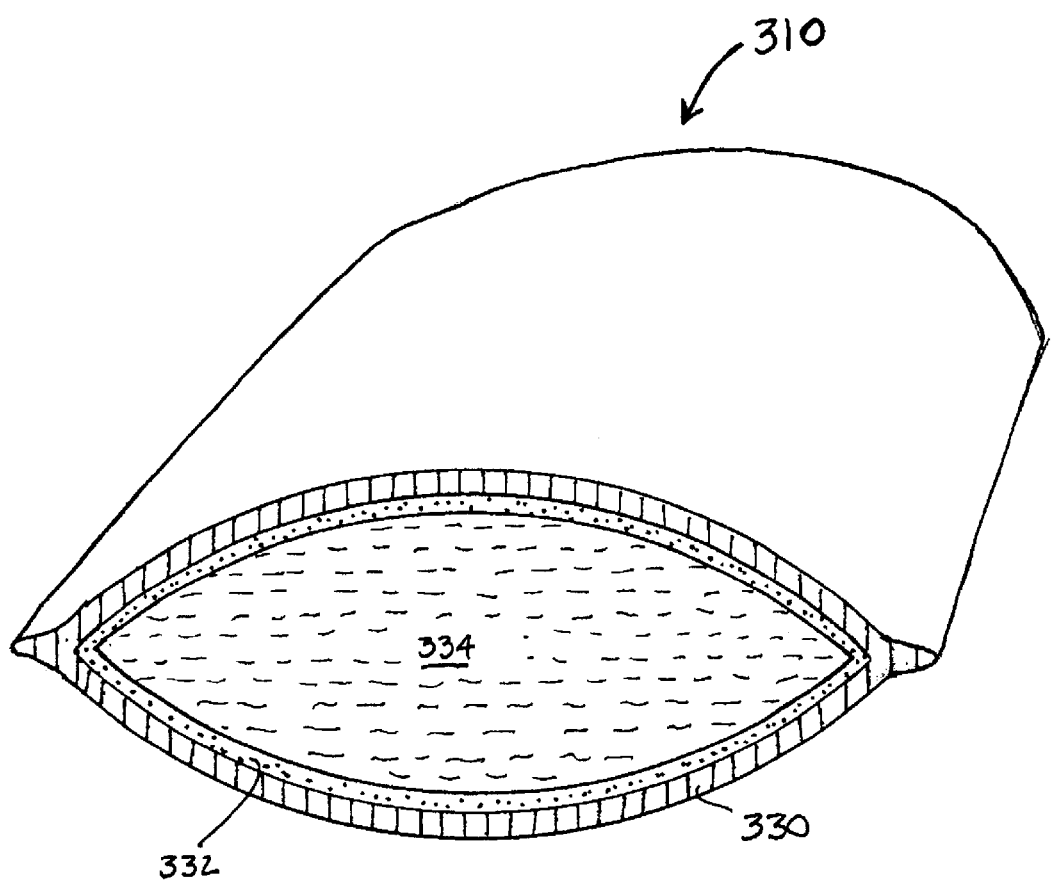
FIG. 3 illustrates a cross-section of a liquid reservoir for a sorption cooling device in accordance with an embodiment of the present invention.

An example of this embodiment of the invention is illustrated in FIG. 3. The liquid reservoir 310 includes a liquid impermeable outer casing 330 (e.g., a pouch). The interior of the casing 330 includes a porous membrane 332 disposed such that the liquid 334 must pass through the membrane 332 before exiting the casing 330. The reservoir 310 can be activated to release liquid by puncturing the casing 330 in an outward direction. For example, an actuator having a sharpened end (not illustrated) can be disposed between the casing 330 and the membrane 332 such that the sharpened end punctures the casing 330 without puncturing the membrane 332. It will be appreciated that the membrane can also be disposed on the exterior of the casing. In this case, the sharpened end of the actuator would point inwardly to puncture the casing without puncturing the membrane.

Another useful flow restriction method is to seal one or more lengths of capillary tubing of a pre-selected diameter into the liquid containing pouch in such a way as to force the liquid to flow through the capillary tube in order to travel from the inside of the pouch to the outside of the pouch. The liquid flow rates for water and the estimated cooling rate for different samples of capillary tubing having a 1 cm length and a diameter ranging from 20 $\mu$m to 100 $\mu$m as are listed in Table 1.

TABLE 1

Capillary Tube Properties

| Diameter ($\mu$m) | Water Feed Rate (ml/hr) | Cooling Rate (W) |
|---|---|---|
| 20 | 0.17 | 0.11 |
| 40 | 2.7 | 1.7 |
| 60 | 13.7 | 8.6 |
| 100 | 106 | 66.8 |

As is evident from Table 1, the cooling rate can be controlled through proper selection of the capillary tubing.

Another method for controlling the liquid flow rate is to create one or several extremely small apertures in an interior pouch disposed in an exterior pouch with an outlet to restrict the flow of liquid from the interior pouch to the evaporator. Such apertures can be formed in the interior pouch by using a laser or particle beam, for example. Still another method is to mold or otherwise incorporate small channels of appropriate size and length into a piece of material such as plastic that is then sealed into the pouch which contains the liquid.

According to one embodiment of the present invention, the flow of liquid can also be controlled using a multi-stage liquid delivery system. In this embodiment, two or more liquid reservoirs can be activated simultaneously or can be activated separately. In a preferred embodiment, a smaller starter volume of liquid (the starter liquid) can be initially released to saturate the evaporator while a larger volume of liquid (the slow feed liquid) is released slowly, as is described above, in order to provide prolonged evaporation of liquid (the slow feed liquid) and extend the useful lifetime of the sorption cooling device. The starter liquid can disperse throughout a wick contained in the evaporator so that initial cooling can begin quickly across the entire surface of the evaporator. The slow feed liquid from the larger volume reservoir can then be fed to the evaporator in a controlled fashion to keep the evaporator saturated during the useful lifetime of the device. The reservoirs may be entirely separate reservoirs that are activated separately or they may be incorporated into a single unit that can be activated by a single actuator.

In the case of separate reservoirs, the starter reservoir can include a volume of liquid that is contained within a liquid impermeable pouch. This pouch is ruptured either by direct mechanical pressure or by indirect or assisted mechanical pressure by means of a mechanical lever or sharpened actuator which is either affixed to the outside of the pouch or integrated within the pouch. This pouch can be located either directly on the evaporator surface or can be located remotely wherein a fluid conduit directs the flow of liquid to the evaporator. If the pouch is located remotely, the fluid conduit may consist of a liquid impermeable material that encapsulates the entire liquid pouch and an actuation mechanism and is adapted to deliver liquid to the evaporator. The liquid will flow under the pressure of the vacuum out the open side of the remote distribution pouch.

In another embodiment, the remote distribution pouch can be sealed on all sides, with one or more apertures in the film through which the liquid is directed to the evaporator. The larger volume of liquid, which is slowly fed to the evaporator, can be encapsulated in a similar pouch and can be actuated by the same or similar means as the starter pouch. The slow feed device, however, will be encapsulated within another pouch, sealed on all sides in which is incorporated liquid flow restriction means, as is discussed above.

Figure 4:
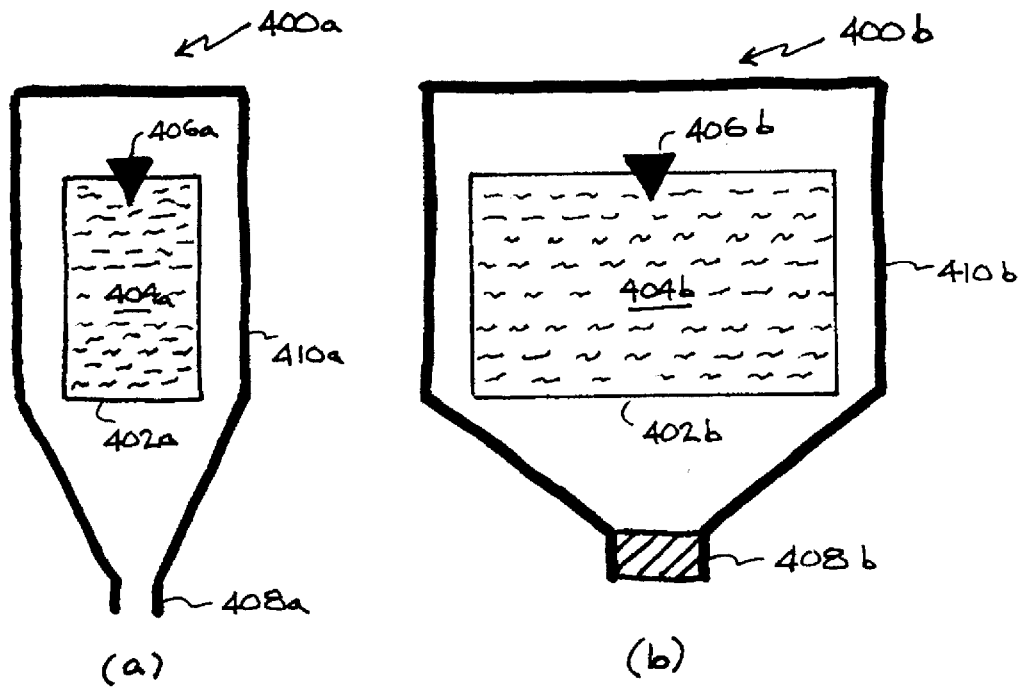
FIGS. 4a and 4b illustrate a multi-stage liquid delivery system that is useful in a sorption cooling device in accordance with an embodiment of the present invention.

An example of two separate reservoirs is illustrated in FIGS. 4a and 4b. FIG. 4a illustrates a starter reservoir 400a. The starter reservoir 400a includes an interior pouch 402a holding a liquid 404a. An actuator 406a is adapted to puncture the interior pouch 402a and release the liquid 404a. The liquid 404a can then flow freely out of outlet 408a in the exterior pouch 410a and to the evaporator to quickly saturate the wicking material, discussed below.

In conjunction with the starter reservoir 400a, a slow feed reservoir 400b is also provided. The slow feed reservoir 400b also includes an interior pouch 402b holding a liquid 404b. Preferably, the volume of liquid 404b is greater than the volume of liquid 404a. An actuator 406b is adapted to puncture the interior pouch 402b and release liquid 404b. The actuator 406b can be activated simultaneously with actuator 406a or at some time after the release of liquid 404a. The liquid 404b then flows out of outlet 408b which includes flow restriction means, such as a porous membrane discussed above.

In the case where the starter liquid reservoir is integrated with the slow feed water reservoir into a single unit, the device can be designed such that a single actuator can activate flow of both the starter liquid and the slow feed liquid. In this case, the starter liquid and slow feed liquid can be connected in such as way that the liquids within the pouches are separated by the liquid flow restriction means. Actuation of the starter reservoir then releases the starter liquid directly to the evaporator and allows the slow feed liquid to exit through the flow restriction means and into the evaporator.

Figure 5:
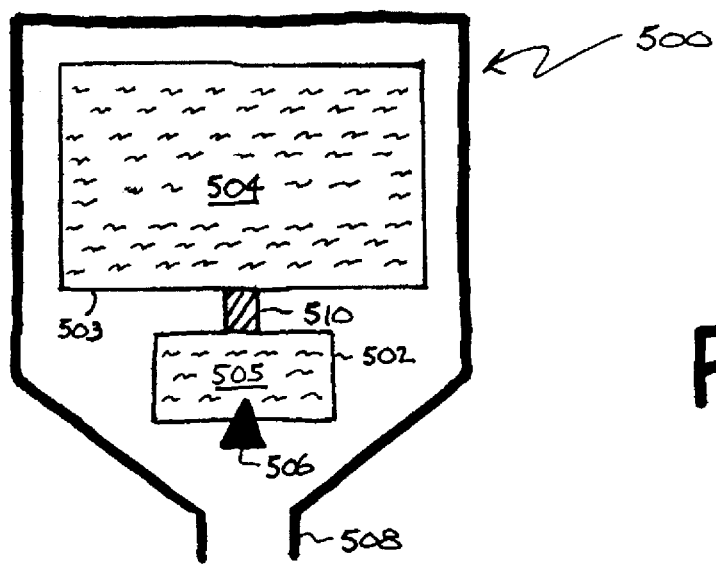
FIG. 5 illustrates a multi-stage liquid delivery system that is useful in a sorption cooling device in accordance with an embodiment of the present invention.

An example of this preferred embodiment is illustrated in FIG. 5. An integrated reservoir 500 includes both a starter pouch 502 and a slow feed pouch 503. Each pouch includes a liquid 504 (slow feed liquid) and 505 (starter liquid). The two liquids 504 and 505 can be identical or can be different. For example, the starter liquid 505 can comprise water with an additive to suppress freezing, as is discussed below, while the slow feed liquid 504 comprises just water.

In the embodiment illustrated in FIG. 5, a single actuator 506 is activated to release the starter liquid 505 through outlet 508. This also causes the slow feed liquid 504 to be released through flow restriction means 510. Thus, a single actuator 506 releases the starter liquid 505 in rapid fashion and also releases the slow feed liquid 504.

The liquid containing pouch(es) may be made from any number of liquid impermeable materials, but will typically be made from low-cost, heat-sealed films such as polypropylenes, polyesters, nylons or other plastics.

Referring back to FIGS. 1 and 2, liquid that is not immediately vaporized can collect in the interstices of a wicking material that can be disposed in the evaporator 108. The wicking material is configured to draw and maintain a desired amount of liquid for vaporization. Thus, the wicking material should have a pore size that is sufficiently large to permit capillary action to draw the liquid from the reservoir. Further, the wicking material should be configured to absorb any vaporized liquid that recondenses. Preferred wicking materials include hydrophilic materials such as microporous metals, porous plastics such as polyethylene and polypropylene, cellulose products (e.g., tissue paper) and other hydroscopic materials. Particularly preferred wicking materials include an absorbent polymer such as polyacrylamide or sodium polyacrylate.

With the liquid to gas phase change, the liquid removes heat from its surroundings that is equal to the latent heat of vaporization of the liquid. The vaporized liquid then passes through the vapor passageway 104 to be absorbed in the absorber 102. An optional vapor permeable membrane 106 can be provided to prevent liquid from migrating to the absorber 102. Examples of suitable membrane materials include various porous films such as TYVEK films (E. I. duPont deNemours Corporation, Wilmington, Del.) and GORETEX films (W. L. Gore and Associates, Newark, Del.). Alternatively, the membrane can have a hydrophilic coating such as SCOTCHGUARD (3M Company).

As is discussed above, it is important that the cooling rate be well-controlled such that the desired temperature range within the shipping container is maintained for a predetermined amount of time. Therefore, it is important to control the evaporation rate of liquid within the sorption cooling device 100. To ensure uniform cooling at the evaporator 108, a spacer 112 can be provided to permit evaporation over the entire surface of the evaporator. The spacer 112 can provide an air gap or can be a highly porous material.

One way of controlling the rate of evaporation is to restrict the flow of vapor through the vapor passageway 104. For example, the vapor passageway 104 could be provided with microchannels adapted to restrict the flow of vapor through the vapor passageway. Further, a membrane having a specified pore size or permeability can be provided in the vapor passageway.

More specifically, in one preferred embodiment, the vapor passageway 104 includes thermally insulating material which is either porous or has apertures formed in the material to allow free vapor flow from the evaporator 108 to the absorber 102. The vacuum conditions under which the sorption cooling device is packaged enhances the high efficiency of the thermal insulation due to the Knudsen effect. That is, there is a reduction in thermal conductivity that occurs when the mean free path of a gas is equal to or greater than the pore size of the insulation. The thermally insulating material preferably has a thermal conductivity of not greater than about 0.035 W/m.K, more preferably not greater than 0.025 W/m.K and even more preferably not greater than 0.015 W/m.K. Further, the thermally insulating material has a vapor permeability of at least about 50 $g/m^2.hr$ at one atmosphere of pressure. Due to the high insulative value of the vapor pathway, the evaporator and the absorber can be disposed in close proximity, separated only by the vapor pathway, to give short vapor transfer distances. For example, although FIGS. 1 and 2 illustrate the vapor passageway 104 as an elongated conduit, it will be appreciated that the absorber 104 can be disposed adjacent to the evaporator 108 with the thermally insulating material disposed between, such that the vapor passageway is defined by the exterior edges of the cooling device.

Thermally insulating materials that can be useful according to this embodiment include open cell foams, such as polyurethanes, polystyrenes, or other foams as well porous insulation including fiberglass or porous silica. As is discussed above, microchannels can also be formed into the material to restrict or regulate the flow of vapor from the evaporator to the absorber.

An active valving mechanism can also be used, such as a bimetallic strip that is responsive to temperature changes. It will be appreciated that other means for restricting vapor flow through the vapor passageway can be utilized.

Liquids for use in accordance with the present invention should have a high vapor pressure at ambient temperature so that a reduction of pressure will produce a high vapor production rate. The liquid should also have a high heat of vaporization per unit mass or volume, should be non-toxic and nonflammable and should have relatively low cost. Suitable liquids include ammonia, various alcohols such as methyl alcohol or ethyl alcohol, ketones (e.g., acetone) or aldehydes (e.g., acetaldehyde). Other useful liquids can include chlorofluorocarbons (CFC) or hydrochlorofluorocarbons (HCFC) such as FREON (E. I. Dupont de Nemours, Wilmington, Del.), a series of fluorocarbon products such as FREON C318, FREON 114, FREON 21, FREON 11, FREON 114B2, FREON 113 and FREON 112.

Preferably, the liquid is an aqueous-based liquid and in a particularly preferred embodiment the liquid consists essentially of water. Water is advantageous due to its high heat of vaporization, low cost and low toxicity. However, it may be desirable to include minor amounts of other components in the liquid in order to control the evaporative properties of the liquid. For example, the liquid can be mixed with a component having a low vapor pressure.

Further, additives to lower the freezing point of the water can be used. Specifically, cooling may occur in the evaporator to such a degree that the liquid may begin to freeze within the evaporator. This can result in many problems, including uneven temperature distribution and uneven distribution of the liquid. If the liquid is fed to the evaporator over a long period of time, freezing may also block the flow of additional liquid to the evaporator. In order to alleviate such problems, it is advantageous to depress the freezing point of the liquid.

This may be accomplished by mixing a freezing point suppression agent with the liquid to lower the freezing point. As many of these substances will also cause a suppression in vapor pressure above the liquid that is proportional to the quantity added, it is important to use only the amount needed to adequately suppress freezing of the liquid. Other high-vapor pressure solvents may be used to depress the freezing point, but these may interfere with the vapor flow from the evaporator to the absorber by producing higher relative pressures between the evaporator and the absorber. Therefore, these must be used in moderation.

Preferred freezing point suppression agents according to the present invention include salts such as metal-chlorides, -bromides, -nitrates, -sulfates and -acetates. Examples of preferred metal salts include those selected from the group consisting of NaCl, $CaCl_2$, $BaCl_2$, $MgCl_2$, $FeCl_3$, $Mg(NO_3)_2$, NaBr, $ZnCl_2$ and mixtures thereof. Other useful freezing point suppression agents include organic solvents such as EtOH, MeOH, IPA, ethylene glycol, propylene glycol and glycerol.

In cases where the liquid is fed to the evaporator over a long period of time, mixing these freezing point suppression agents with the bulk liquid can cause an accumulation of these compounds in the evaporator over time. As the liquid evaporates, the compound will remain in the evaporator while additional amounts of the compound are introduced with the in-flowing liquid.

In order to minimize this problem, the proper volumes of the freezing point suppression agent may be introduced to the evaporator either through pre-impregnation of the evaporator or by deposition of the agent with the starter liquid only, as is discussed above. In this way, when new evaporant liquid is fed into the evaporator, it will mix with the agent in the correct proportion to reduce freezing in the evaporator. For example, a wicking material disposed in the evaporator can be impregnated with a controlled amount of a freezing point suppression agent.

The absorber 102 includes a desiccant that is compatible with the liquid. That is, the desiccant must be capable of absorbing and/or adsorbing the vapor that is formed from the liquid. The desiccant can be contained, for example, in a vapor permeable pouch. A spacer 114 can also be provided to ensure even absorption and heating of the dessicant. The mechanism by which the desiccant functions can be a combination of adsorption and absorption and as used herein, the terms absorb, absorption and the like refer to the retention of liquid by the desiccant, regardless of the actual mechanism by which the liquid is retained. The desiccant is preferably of such a nature and quantity as to absorb all of the vaporized liquid. To enhance absorption rates, the desiccant can be activated prior to introduction into the absorber 102. Activation methods can include techniques such as heating the desiccant to remove moisture and/or any non-condensable gases. When the liquid is water, the desiccant preferably absorbs at least about 50 percent of its weight in liquid at a water pressure of 5 mbar, more preferably at least about 75 percent by weight at a pressure of 5 mbar and even more preferably at least about 100 percent by weight at pressure of 5 mbar.

The preferred desiccant will also absorb at least about 20 percent of its weight in water at 10 percent relative humidity, and at least 40 percent of its weight in water at 50 percent relative humidity and ambient temperature. More preferably, the desiccant will absorb at least 40 percent of its weight at 10 percent relative humidity and 60 percent of its weight at 50 percent relative humidity. Even more preferably, the desiccant will absorb at least about 60 percent of its weight at 10 relative percent humidity and at least about 80 percent of its weight at 50 relative percent humidity.

Suitable desiccants include zeolites, barium oxide, activated alumina, silica gel, glycerine, magnesium perchlorate, calcium sulfate, calcium oxide, activated carbon, calcium chloride, glycerine silica gel, alumina gel, calcium hydride, phosphoric anhydride, phosphoric acid, potassium hydroxide and sodium sulfate.

A particularly preferred desiccant in accordance with the present invention is a surface modified porous material. The porous material can be a material such as activated carbon or silica. Preferably, the porous material has a pore volume of at least about 0.8 cc/g and average pore size of from about 1 to about 20 nm. The surface modification can include impregnating the porous material with one or more metal salts such as a metal salt selected from the group consisting of calcium chloride, lithium chloride, lithium bromide, magnesium chloride, calcium nitrate, potassium fluoride and the like. The porous support material is preferably loaded with from about 20 to about 80 weight percent of the metal salt and more preferably from about 40 to about 60 weight percent of the metal salt. Such desiccant compositions are described in detail in U.S. patent application Ser. No. 09/691,371, which is commonly-owned with the present application and which is incorporated herein by reference in its entirety.

Figure 6:
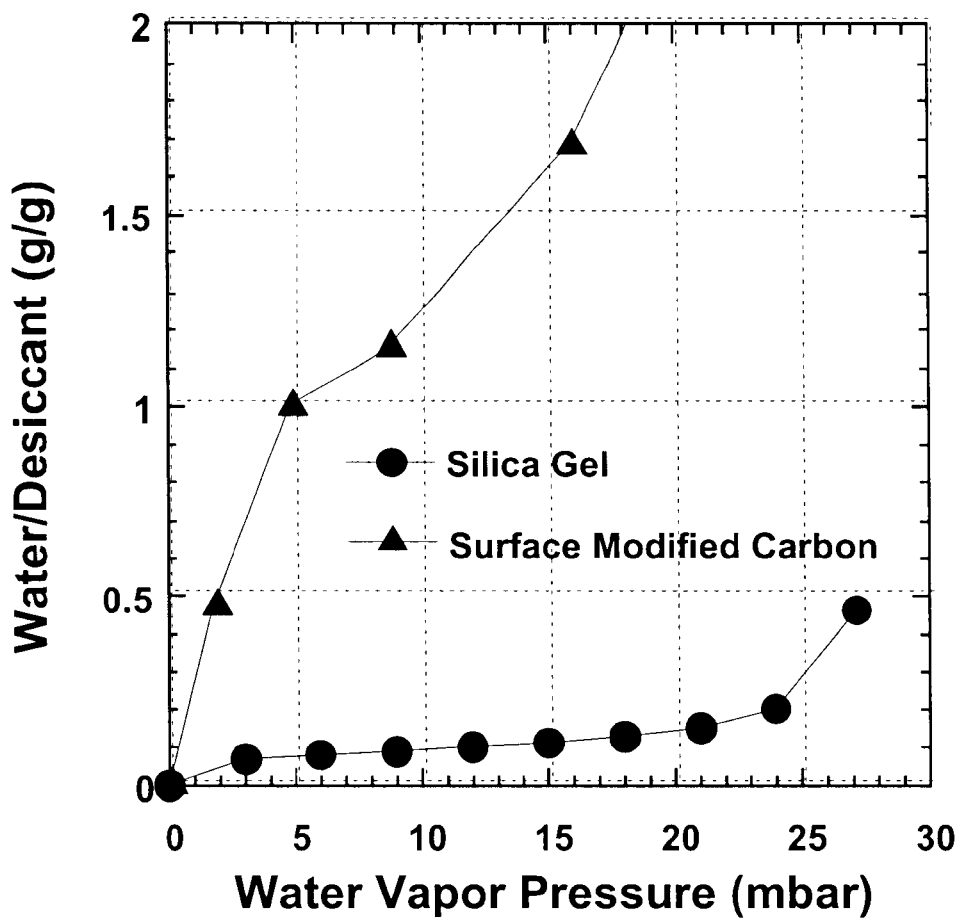
FIG. 6 illustrates the absorption capacity of two different desiccants that are useful in accordance with the present invention.

FIG. 6 illustrates the capacity of a preferred desiccant according to the present invention to absorb water at 24° C. compared to silica gel at various vapor pressures. The surface modified desiccant illustrated in FIG. 6 is a surface modified carbon. The desiccant is formed from activated carbon having lithium chloride impregnated on the activated carbon in a 1:1 mass ratio (i.e., 50 weight percent lithium chloride). To fabricate the desiccant, lithium chloride salt is dissolved in water and dried activated carbon is added to the solution. The solution is adsorbed into the activated carbon and is then dried, leaving the activated carbon impregnated with the lithium chloride. The process can be repeated to increase the loading of lithium chloride, if necessary.

It can be seen that this desiccant has substantially higher water adsorption ability as compared to the silica gel. The use of desiccant compositions having such high absorption capabilities enables the sorption cooling device to provide high cooling densities, thereby reducing the cost of shipping associated with the container as compared to gel packs and similarly cooled containers.

Figure 7:
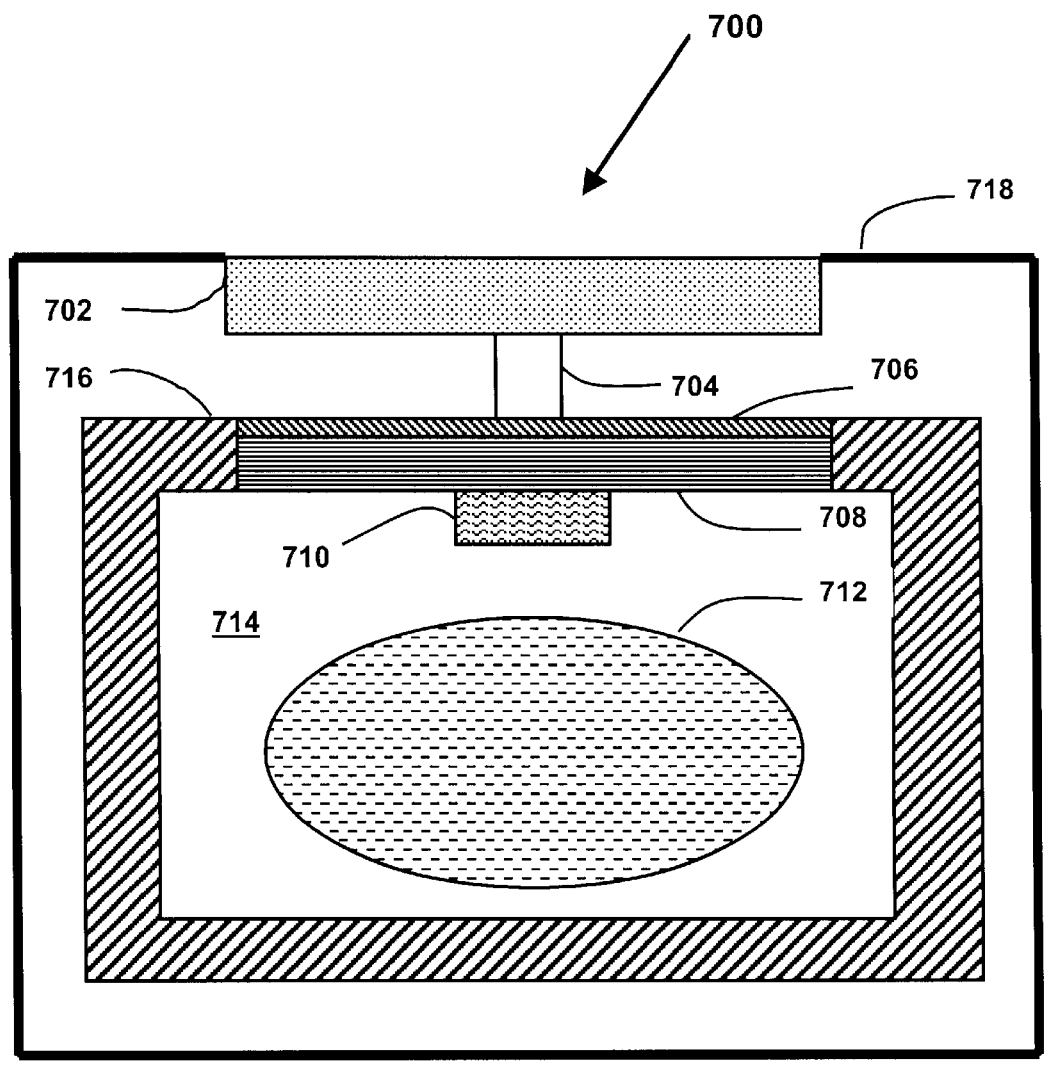
FIG. 7 illustrates a cross-section of a temperature-controlled shipping container in accordance with an embodiment of the present invention.

A sorption cooling device incorporated into a shipping container in accordance with the present invention is illustrated in FIG. 7. The cooled shipping container 700 includes a sorption cooling device substantially as described with respect to FIGS. 1 and 2. Although illustrated as a rectangular-shaped box, it will be appreciated that other container configurations can also be utilized such as cylindrical containers and the like.

The evaporator 708 of the sorption cooling device is in thermal communication with a product 712. The product 712 is disposed within a cavity 714 that is defined by the top, bottom and side walls of an insulated insert 716. In a preferred embodiment, the insulated walls defining the product cavity preferably have a thermal resistance of not greater than about 2 W/m².K and more preferably not greater than about 1 W/m².K. However, it will be appreciated that such highly insulative walls may not be necessary for all applications of the present invention If necessary, the insulated insert 716 can be placed in an external container 718, such as a corrugated cardboard box. The absorber 702, which generates heat as liquid is absorbed, can in thermal communication with the exterior of the external container 718 such that heat is dissipated to the external environment. Alternatively, the absorber could be located outside of the insulated insert 716 and within the external container 718. If the absorber 702 is within the external container 718, venting means such as slots or perforations in the external container 718 can be provided to assist in the dissipation of heat. What is important in accordance with the present invention is that the heat generated at the absorber 702 is thermally isolated from the product cavity so that the product cavity is able to maintain a sufficiently cool temperature for a sufficient length of time.

The preferred material for the insulated walls will depend upon the application of the shipping container, such as the relative value of the products being shipped and the cooling requirements associated with the product. Table 2 summarizes the properties of four available materials: corrugated cardboard; expanded polystyrene (EPS); polyurethane; and vacuum insulated panels (VIPs).

TABLE 2

Examples of Insulative Materials

| Material | Thermal Conductivity (W/mK) | Recyclability | Formability | Relative Cost |
|---|---|---|---|---|
| Corrugated Cardboard | ~0.05 | High | Yes | Low |
| EPS | 0.035 | Moderate | Yes | Low |
| Polyurethane | 0.025 | Difficult | Yes | Medium |
| VIPs | <0.006 | Varies | No | Very High |

For example, the insulated container 716 can include EPS as the sidewall material where the product 712 is a relatively low-value commodity that is sensitive to increased costs. EPS has the advantage that it has a low-cost and is easily formed into a variety of shapes. However, to ensure sufficient insulation, a relatively thick amount of EPS is typically used. Further, there are environmental concerns with respect to the use of EPS.

VIPs have a very low thermal conductivity and therefore can be utilized in thinner sections than, for example, EPS. However, VIPs have a relatively high cost and would typically be used for high value commodities such as pharmaceuticals and medical specimens.

Figure 8:
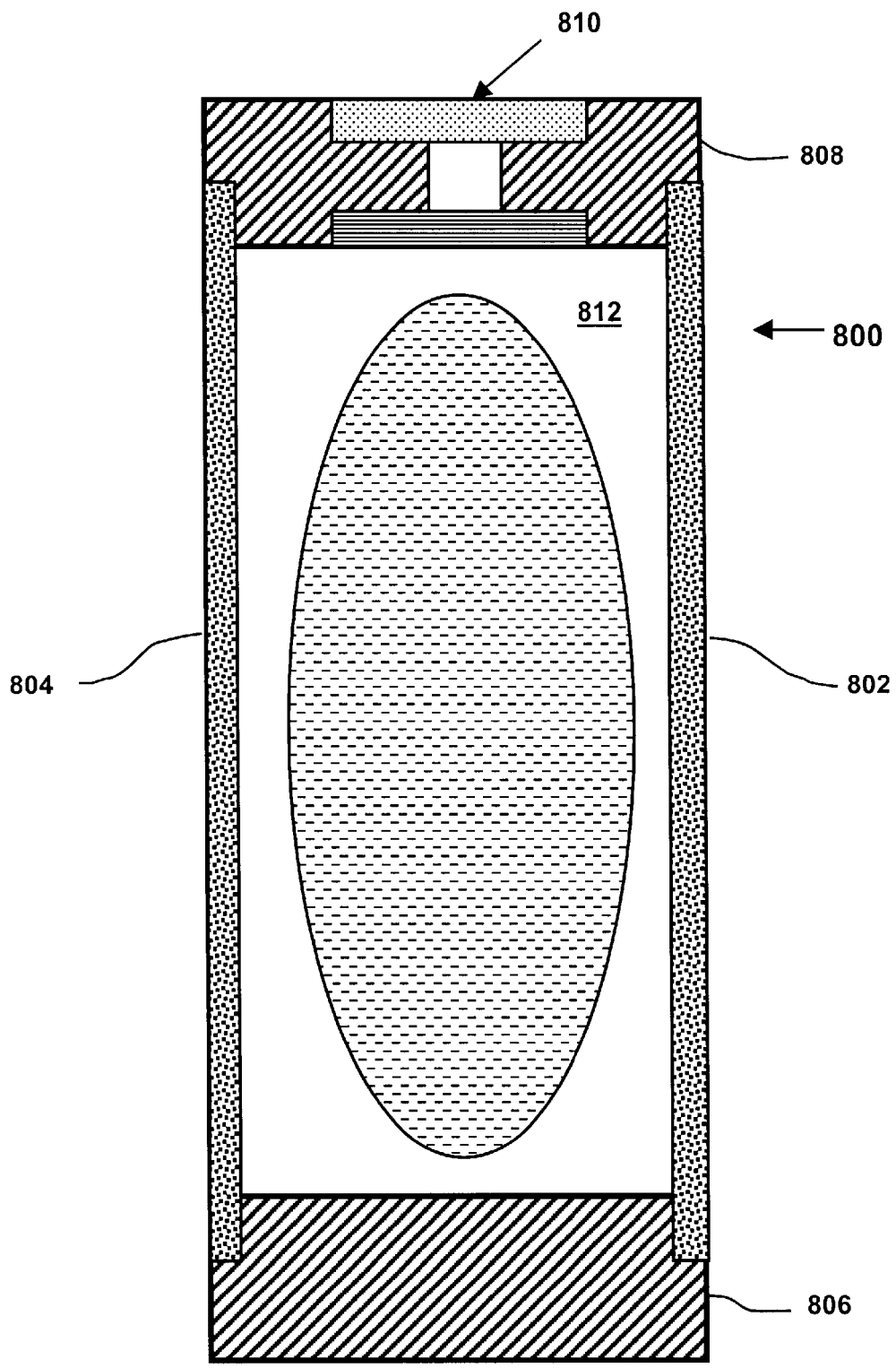
FIG. 8 illustrates a cross-section of a temperature-controlled shipping container in accordance with an embodiment of the present invention.

It will be appreciated that combinations of two or more insulated materials can also be utilized. For example, VIPs could be utilized in the thin areas of the cargo area with EPS at the opposite sides. FIG. 8 illustrates a cross-sectional view of an insulated shipping container insert in accordance with an embodiment of the present of the present invention. The insulated shipping container insert 800 includes vacuum insulation panels 802 and 804 on the opposite sides of the insert, thereby maximizing the volume of space in the product cavity 812. The bottom insulator 806 is fabricated from expanded polystyrene. The top insulator 808 is also fabricated from expanded polystyrene and includes a sorption cooling device 810 to maintain a reduced temperature within the product cavity 812.

According to one embodiment of the present invention, the sorption cooling device is disposable. That is, the sorption cooling device can be adapted to be used and then thrown away. Alternatively, the sorption cooling device can be partially or wholly recyclable. In order to recycle the sorption cooling device, the desiccant in the absorber must be regenerated or replaced. Regeneration of the desiccant entails removing liquid from the desiccant by either heating the desiccant, subjecting the desiccant to a vacuum or both. Further, additional liquid must be provided to the sorption cooling device for subsequent use.

The desiccant can be regenerated either by removing the desiccant from the device or by regenerating the desiccant in-situ. For example, the entire sorption cooling device can be returned to the manufacturer where it is dismantled and the desiccant is removed and regenerated for use in new cooling devices. Alternatively, the absorber can be designed as a removable piece of the sorption device. This piece would then be returned and the desiccant removed and regenerated as described above. Regenerated desiccant can then be placed in new desiccant packs which can be packaged and placed into existing devices. According to yet a further embodiment, the absorber can be packaged, such as in a rigid container, and can be regenerated in-situ by opening a valve in the absorber and placing the entire absorber in either an oven or a vacuum. Also, an integral heating unit could be provided with the absorber whereby the heating unit can be activated to regenerate the desiccant in-situ.

Figure 9:
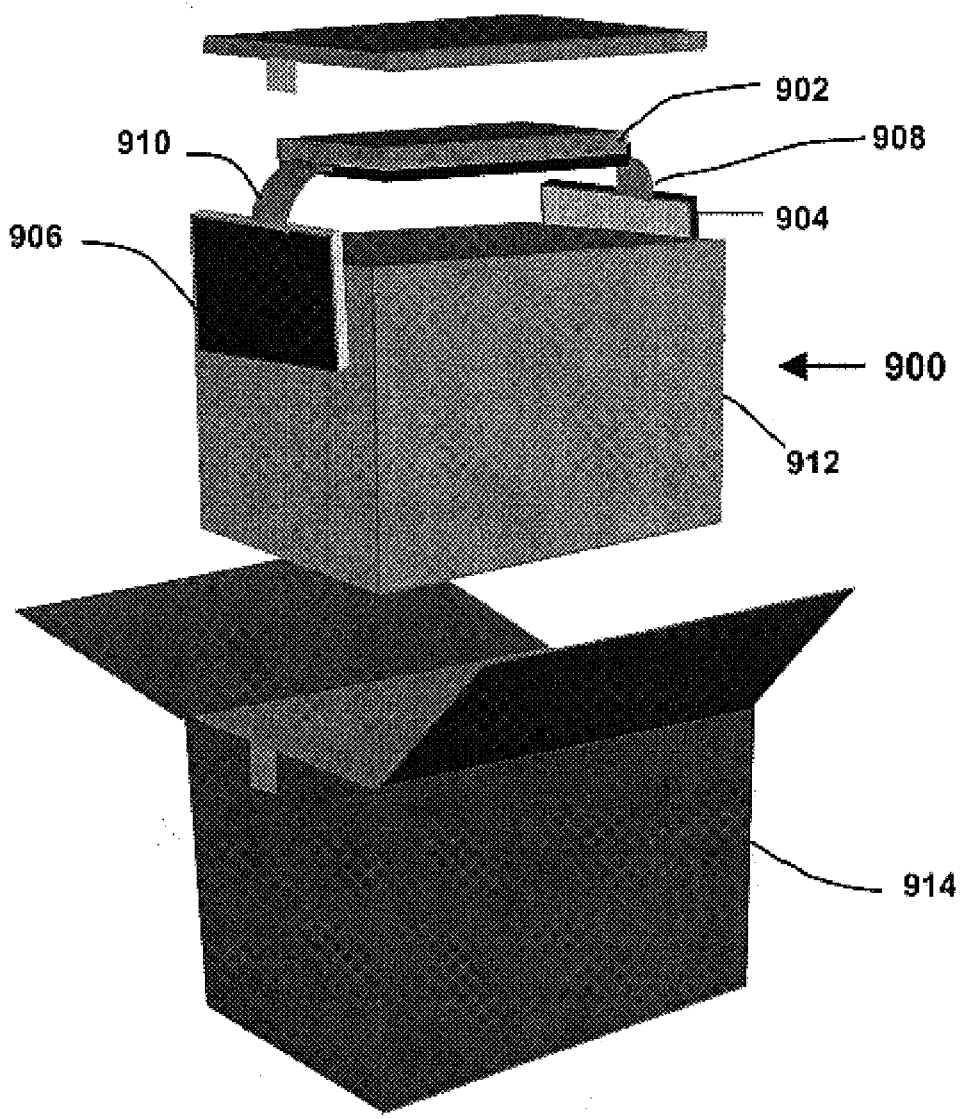
FIG. 9 illustrates a perspective view of a temperature-controlled shipping container in accordance with an embodiment of the present invention.

FIG. 9 illustrates yet another embodiment of the present invention wherein the cooling capacity of the cooling device is enhanced by utilizing two absorbers. Specifically, FIG. 9 illustrates a shipping container 900 which includes a sorption cooling device including an evaporator 902 and absorbers 904 and 906. The absorbers 904 and 906 are connected to the evaporator 902 by vapor passageways 908 and 910.

The evaporator is placed within a cavity defined by an insulated box 912. The absorbers 904 and 906 are placed on the external portion of the insulated box 912. The entire insert can then be placed in an external container 914 for shipment, such as a corrugated cardboard box. As is discussed above, the external box can be provided with venting means to assist in the dissipation of heat from the absorbers 904 and 906.

Figure 10:
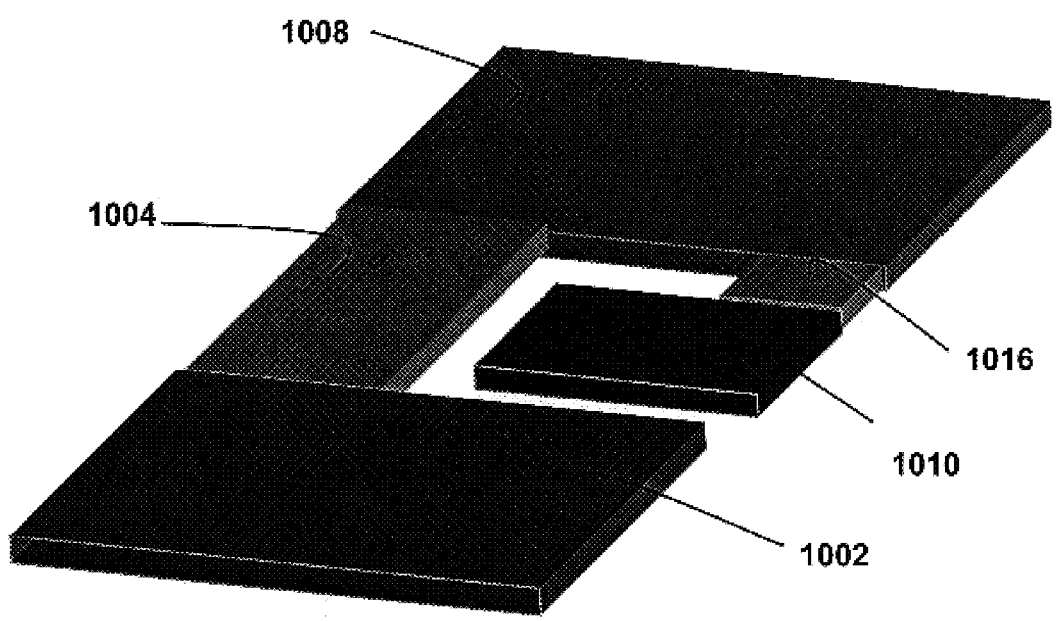
FIG. 10 illustrates a sorption cooling device in accordance with an embodiment of the present invention.

FIG. 10 illustrates an alternative embodiment of a sorption cooler according to the present invention. The sorption cooler device 1000 is a flat design useful for cooling small packages. The liquid reservoir 1010 provides water through a channel 1016 to an evaporator 1008. The vaporized water then passes through vapor passageway 1004 to the absorber 1002. The entire assembly can be sealed in a vapor impermeable film, such as metallized polyester. In use, the absorber 1002 is thermally isolated from the evaporator 1008 and the item to be cooled is positioned adjacent to the large surface of the evaporator 1008. The opposite surface of the evaporator 1008 can be insulated to maximize the cooling affect.

Table 3 illustrates the cooling performance of a sorption cooling device in accordance with the present invention as compared to the prior art.

TABLE 3

Cooling Options

| Cooling Mechanism | Nominal Temperature (° C.) | Energy/Mass (W · hr/kg) | Energy/Volume (kW · hr/m³) |
|---|---|---|---|
| Ice/Gel Packs* | 0 | 92 | 92 |
| Dry Ice* | −78 | 208 | 175 |
| Liquid Nitrogen* | −196 | 55 | 44 |
| Phase Change Materials* | Variable | 30–70 | 30–60 |
| Sorption Cooling | −20 to +20 | 180–315 | 145–250 |

*Prior Art

For optimal cooling performance while maintaining reasonable mass and the volume for reduced shipping costs, is desirable that the energy density values (energy/mass and energy/volume) be as high as possible. As is illustrated in Table 3, although ice/gel packs have a relatively low cost, the energy density values are relatively low. Therefore, a large mass and volume of the ice/gel packs is required to cool the shipping container.

Likewise, liquid nitrogen and phase change materials also have very low energy densities. Although dry ice has a higher energy density, dry ice is considered hazardous and is not an acceptable material for air freight.

Absorption cooling in accordance with the present invention provides a useful range of cooling, from −20° C. to +20° C., and has a high energy density. The energy density values listed for the sorption cooler are based upon a desiccant absorption capacity of 50 weight percent to 200 weight percent and a total mass or volume based on the sum of the liquid and the desiccant. The actual value will depend on the desiccant capacity and the packaging configuration. Preferably, the mass energy density is at least about 100 W.hr/kg, more preferably at least about 180 W.hr/kg. Further, the volume energy density is at least about 80 kW.hr/m³ and more preferably is at least about 150 kW.hr/m³.

According to another embodiment of the present invention, a multiple stage sorption cooling device is provided to cool the shipping container. A multiple stage sorption cooling device is particularly useful when the product must be maintained at very low temperatures, such as not greater than 0° C.

Figure 11:
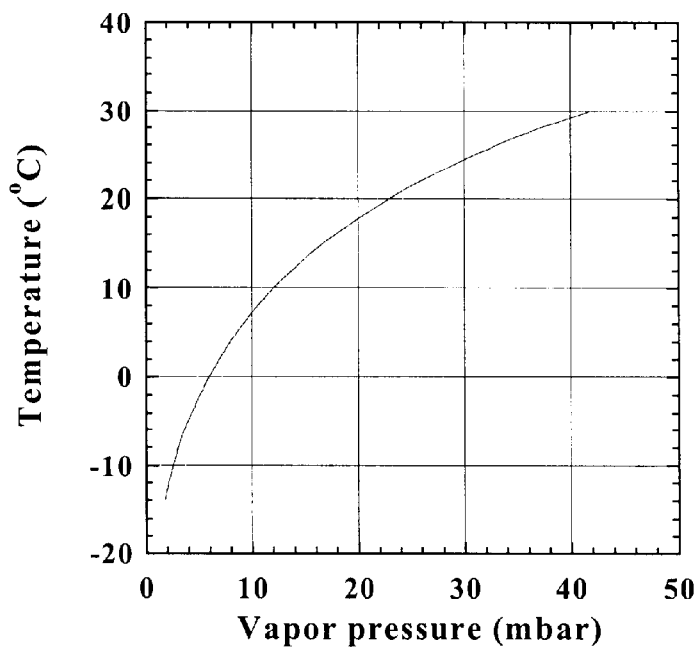
FIG. 11 illustrates the vapor pressure of water as a function of temperature.

When liquid water is evaporated, there is an equilibrium vapor pressure of the water that is a function of the temperature of the water. For different applications of the shipping container, different liquid temperatures are needed to maintain the desired temperature within the container. For example, water temperatures of less than 10° C. are desired for the 2° C. to 8° C. shipping container and less than 0° C. for a frozen product. The equilibrium water vapor pressure for these different temperatures is illustrated in FIG. 11. As the temperature increases, the equilibrium vapor pressure also increases.

Figure 12:
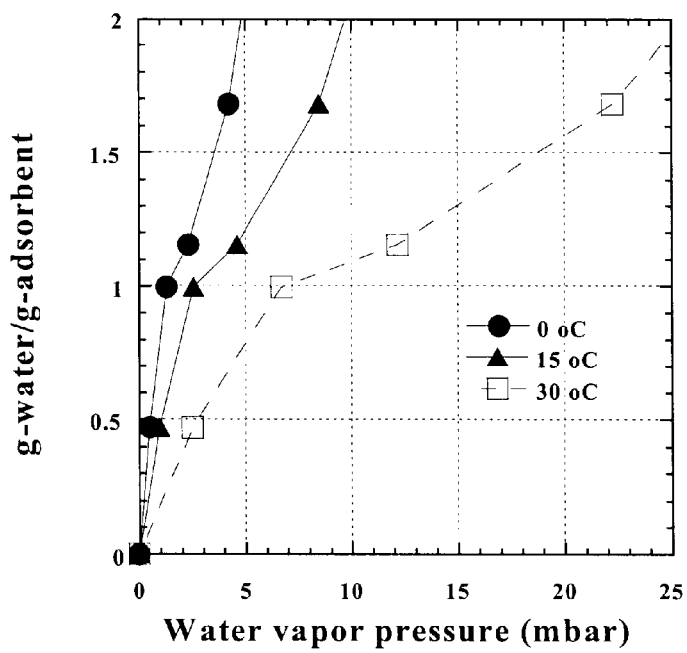
FIG. 12 illustrates the capacity of a selected desiccant as a function of water vapor pressure and temperature.

As is illustrated by FIG. 6, the capacity of a desiccant also depends upon the water vapor pressure. Specifically, as the vapor pressure increases, the capacity of the desiccant to absorb water also increases. Thus, the capacity of the desiccant is also dependent upon the temperature of the water. This is illustrated by FIG. 12 for three different temperatures. The practical result is that if a large temperature difference is needed between the evaporator and the desiccant (e.g, a very low evaporator temperature is needed), the absorption capacity of the desiccant will be relatively low.

According to one embodiment of the present invention, a multiple stage sorption cooler is utilized to address this problem. In a multiple stage sorption cooler, two evaporators are used wherein the first evaporator cools the product cavity and the second evaporator cools the desiccant bed that is associated with the first evaporator. Thus, the effective temperature difference between the first evaporator and the hottest desiccant bed is effectively doubled.

Figure 13:
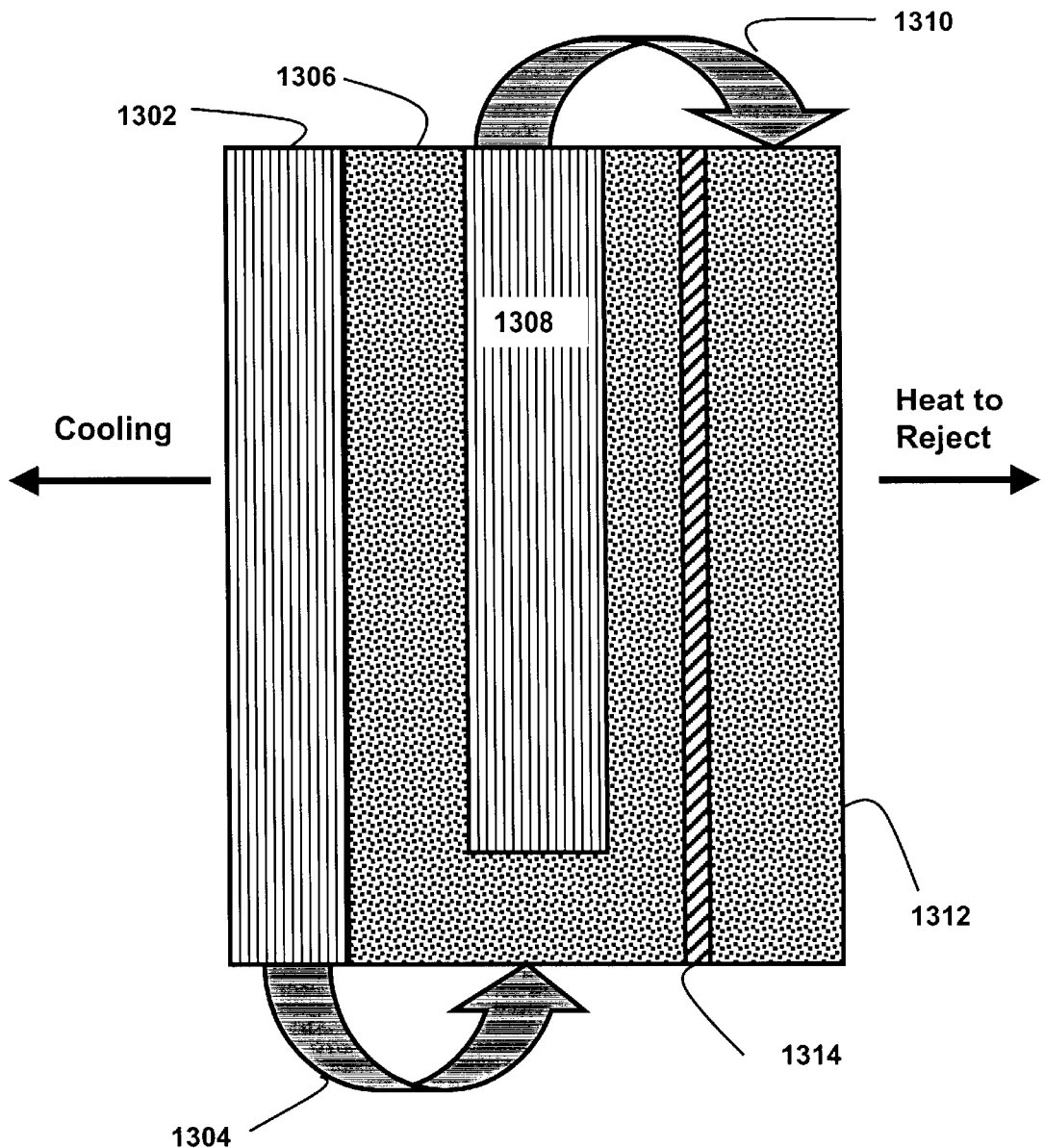
FIG. 13 schematically illustrates a multi-stage sorption cooling device according to an embodiment of the present invention.

A schematic illustration of a multiple stage sorption cooler in accordance with the present invention is illustrated in FIG. 13. A first evaporator 1302 is utilized to provide cooling to a product cavity. A vapor passageway 1304 provides the vapor to a first absorber 1306 that includes a desiccant. As the first absorber 1306 generates heat due to the absorption of vapor, a second evaporator 1308 is activated to cool the desiccant in the first absorber 1306. This enables the first absorber 1306 to capture more liquid. A second vapor passageway 1310 connects the second evaporator 1308 to a second absorber 1312. A thermal spacer 1314 can be used to isolate the first and second absorbers, if necessary.

To illustrate the foregoing embodiment, consider that 1 kg of water provides approximately 630 W.hr of cooling. If the desiccant absorbs 1 kg of water per kg of desiccant and has a heat of adsorption that is 120% of the heat of vaporization, a single stage sorption cooler that is designed for 10 W of cooling would provide cooling for 63 hours, would weigh 2 kg and would need to reject 12 W of heat. For a two-stage cooler with the same cooler capacity but running at twice the temperature difference between the hot and cold sides, a total of 2.2 kg of water and 2.2 kg of desiccant would be required and the cooler would need to reject 14.4 W of heat.

Thus, an acceptably small increase in the mass of liquid and desiccant can provide greatly increased cooling capacity and will be useful for maintaining very low temperatures (e.g., below 0° C.) for extended periods of time.

It will be appreciated that the extension of the two-stage cooler illustrated in FIG. 11 to three or more stages is straightforward. With each extra stage, the amount of heat generated for a given amount of cooling decreases and the mass and volume of both refrigerant and adsorbent increases.

Shipping Containers

Prototype shipping containers were fabricated incorporating sorption cooling devices according to the present invention. Two different size sorption cooling devices were tested. "Size A" had dimensions of 7"×8"×1.5" and "Size B" had dimensions of 5"×6"×1.25."

The sorption cooling of devices include layers of different materials stacked on each other. These layers will be described in order from the exterior face of the cooling device (i.e., the absorber) to the interior face (i.e., the cooling surface of the evaporator). The interior face of the device faces the cavity of the container.

A. Absorber

To form the absorber, a dessicant is contained by a porous bag sealed by an ACCU-SEAL 50 (Accu-Seal Corporation, San Diego, Calif.). The porous bag is constructed of a spun bonded polyethylene material (ReeMay, Old Hickory, Tenn.). The finished desiccant bag dimensions are about 7"×8" for a Size A cooler and 5"×6" for a Size B cooler, as measured from the inside of one seal to the inside of the opposite seal. The dessicant is uniformly distributed within the bag when the bag is laying flat. Size A utilized 80 grams of dessicant while Size B utilized 25 grams of desiccant. The desiccant was a surface modified desiccant consisting of lithium chloride (LiCi) dispersed on an activated carbon support in a 1:1 mass ratio. To fabricate the desiccant, lithium chloride salt was dissolved in water and dried activated carbon was added to the solution. The solution was dried, leaving a composite desiccant including activated carbon impregnated with 50 wt. % chloride.

B. Thermally Insulating Material

The insulating portion of the sorption cooling device included three separate layers: a 1" thick piece of INSTILL (an extruded open-cell polystyrene available from Dow Chemical Company, Midland, Mich.) sandwiched between two layers of MANNIGLASS 60 (a non-woven fiberglass available from Lydall-Manning, Troy, N.Y.). For a Size A cooler, the first MANNIGLASS layer and the INSTILL layer are cut to a size of 7"×8" and the second layer of MANNIGLASS is cut to a size of 5"×6". The INSTILL is drilled with a ⅛" bit in a 5"×6" area centered in the middle of the INSTILL layer, with a hole density of about 7 holes per square inch. For a Size B cooler, all three insulating pieces are cut to a size of 5"×6". The INSTILL piece is drilled with a ⅛" bit over the entire 5"×6" area so that it has a hole density of about 7 holes per square inch.

C. Evaporator

A composite material consisting of an expanded tetrafluoroethylene fluorocarbon polymer (TEFLON, E. I. duPont deNemours and Company, Wilmington Del.) laminated onto a spun bonded polyethylene material was obtained from Tetratex, Feasterville, Pa. The composite material had an average pore size of 1 μm and was in the form of a bag. For a Size A cooling device, the width of the bag is 8" and the length is at least 16". For a Size B cooling device, the width of the bag is 5" and the length is 6". The bag is sealed using an ACCU-SEAL 50 with the interior of the bag containing the wicking material. The wicking material is a KIMWIPE EX-L (Kimberly-Clark Corporation, Roswell, Ga.), a paper tissue manufactured from 100 percent virgin wood fiber. The dimensions of the paper tissue is 7"×8" for a Size A device and 5"×6" for a Size B device.

D. Water Reservoir System

For a Size B device, the water reservoir system included a small water reservoir taped to the center of the 5"×6" wicking material. For a Size A device, the water reservoir system included a small starter water reservoir in a pouch and a large water reservoir in a large pouch. These will be described separately.

1. Large Water Reservoir and Pouch a. Water Reservoir

The water reservoir bag was fabricated from a plastic material cut and sealed in the shape of a rectangle having a size of 4"×3". The plastic is a polyester-polyethylene material available from Rollprint Packaging Products, Addison, Ill. The plastic bag is sealed on all four sides with little or no air in the sealed bag. A graduated syringe with an 18 guage needle is used to fill the bag. A corner of the bag is punctured with the needle through one side of the plastic and the bag is filled with the water from the syringe. The Size A bag is filled with 40 milliliters of water. The plunger of the emptied syringe, with the needle still in the bag, is slowly pulled to extract any trapped air in the bag. With the needle still in the bag, the puncture in the bag is placed on the ACCU-SEAL 50 so that the machine seals the bag closed. The needle is not removed from the bag until the machine is in the process of sealing the bag so that no water leaks out of the puncture. Once the full bag is sealed, it is very flexible. The bag cannot be used in this condition—it must be resealed repeatedly to form a progressively smaller bag until the full bag cannot be sealed to a smaller size. Any excess edges formed from the sealing are trimmed with a ¼" edge remaining and these edges are taped flat to the tightened bag. A 1"×¾" puncturing device (described below) is taped to one face of the full reservoir ensuring that the tape does not cover the point of the puncturing device. This device is described more fully below.

b. Large Pouch with Filter

The large water reservoir is contained within a large triangular pouch having a 1 cm×1 cm filter at one end. The filter is cut from a larger piece of a 0.1 μm filter material (Micron Separations Inc., Westboro, Mass.). The triangular pouch has dimensions of 7" across the base and two equal 6" sides. The filter is sealed with an ACCU-SEAL 50 into one side of the narrow point of the triangular pouch. The large water reservoir is placed in the pouch near the base. To create channels to carry water from the punctured reservoir to the filter, a plastic cord is used that is approximately 8" in length. To create the channels, the cord is doubled and one end of the cord is placed under the filter. The doubled cord reaches the reservoir and is in contact with the point of the puncturing device. Finally, the large pouch is completed by sealing with the ACCU-SEAL 50 across the base.

2. Starter Water Reservoir and Pouch a. Starter Water Reservoir

The starter bag is constructed of the same plastic material and in an identical manner as the large reservoir described above. However, the initial dimensions of the plastic bag are 1½"×2". This starter bag contains 5 milliliters of a solution containing 10% NaCl and 90% water. As described earlier, the bag is sealed so that it is tight. A puncturing device is attached to one face of the reservoir with tape.

b. Starter Water Reservoir Pouch

The starter water reservoir pouch is constructed of the same plastic material as the reservoirs and pouches described above. However, the shape of the starter pouch is roughly T-shaped. The upper bar of the T-shape is approximately 2" in width and 4" in length while the leg of the T-shape is approximately ½" in width and 8" in length. The starter pouch has a 1 mm hole punctured through one side of the plastic about ¼" from the bottom of the T-shape. A 14" long cord is doubled and one end placed so that it surrounds the hole at the bottom of the pouch. The doubled cord reaches the starter reservoir and is in contact with the point of the puncturing device.

3. Puncturing Device

A puncturing device is made from a 0.034" thick aluminum sheet. It is cut in a teardrop shape approximately 1"×¾" for the large water reservoir and approximately ½"×¼" for the small water reservoir. The point of the teardrop is sharp and is slightly bent so that when the device is taped to the reservoir, the point presses into the reservoir.

4. Attaching Water Reservoir System to Wick (Size A only)

The starter pouch is attached so that the end with a hole punctured in it is centered on the wick. The starter pouch is attached with a minimum of tape. The filter end of the larger pouch is attached to the 8" side of the wick approximately ½" from the edge. Both the starter pouch and the larger pouch extend in the same direction over the same edge of the wick. The pouches and attached wick are placed inside the TEFLON composite bag. The wick lies flat in the composite TEFLON bag and any wrinkles are removed. Once the pouches and the wick are placed in the composite TEFLON bag, the bag is sealed.

E. Assembly of Cooling Device

1. Size B Cooler

From bottom to top, the device is fabricated by stacking the MANNIGLASS on top of the dessicant bag, followed by the INSTILL layer and the remaining layer of MANNIGLASS.

The composite TEFLON bag is laid on top with the water reservoir facing out. The stacked cooler components are placed into a plastic bag made of a polyester-polyethylene laminate material described above. This bag has a sufficient size to contain the entire cooler stack. The bag is then evacuated to a pressure of 1.75 Torr.

2. Size A Cooler

From bottom to top, the cooler stack is formed with the desiccant bag first. Next, a layer of MANNIGLASS is laid on top of the desiccant bag, followed by the INSTILL, followed by the remaining layer of MANNIGLASS.

The composite TEFLON bag is laid on top of that with the water reservoirs facing outwardly and the composite TEFLON bag is arranged on top of the insulation so that the wick inside the composite TEFLON bag is directly over the insulation. The composite TEFLON bag should extend over one end of the insulation.

The stacked cooler components are placed into a plastic bag made of the polyester-polyethelene laminate material described above. This bag is of sufficient size to contain the stacked cooler components. The bag is then evacuated to a pressure of 1.75 Torr.

F. Shipping Containers

The containers were constructed of pieces of an insulating material taped together to form four sides and and bottom. The cooling device to be tested is placed on the top of the container, thereby enclosing the shipping cavity.

1. VIP Container

To make a container constructed of 1" thick vacuum insulation panels (VIPs), the dimensions of the five pieces were: two pieces at 6"×6", two pieces at 7"×6", and one piece at 7"×8". U.S. Pat. No. 5,877,100 by Smith et al. provides details on how to assemble an individual VIP and this patent is incorporated herein by reference in its entirety.

The four sides of the container consist of the two 6"×6" and the two 7"×6" pieces with the 7"×8" piece forming the bottom of the box. The pieces are fitted together so that the four sides are perpendicular the bottom and the sides do not hang over the edges of the bottom. Tape is used to secure all pieces to each other and to cover any joints between pieces. The inside cavity of the finished container is 5" wide×6" long×6" deep.

2. EPS Container

A container constructed of 1" thick EPS (expanded polystyrene) material was assembled in a similar manner as the VIP container, except the dimensions of the pieces are as follows: two 6"×6", two 7"×6", two 9"×10", two 8"×6" and two 9"×6". Before assembling the container, all cut sides of the EPS are taped so that the foam edges do not crumble. The EPS container is double-walled on the sides and the bottom. The two 9"×10" pieces are stacked to form the bottom of the box and the inner wall consists of the two 6"×6" and the two 7"×6" pieces fitted together. The outer walls of the box consist of the two 8"×6" and the two 9"×6" pieces that are fitted together around the inner walls. Tape is used to secure all pieces to each other and to cover any joints between pieces. The inside cavity of the finished box is 5" wide×6" long×6" deep.

To begin cooling, the water reservoir(s) is punctured and the cooling device is quickly placed onto the top of the containers. The 7"×8" cooling device (Size A) is placed onto the open top of the container with the desiccant facing outwardly. The 5"×6" cooling device (Size B) is pushed into the container cavity until the desiccant is flush with the top of the sides of the container. For both sizes, the cooling device is secured to the container so that all joints between the cooling device and the container are covered with tape.

The performance of the cooling devices was tested by monitoring the temperature as a function of time for the internal cavity of the container, the external surface of the desiccant and the room. Prior to every experiment, Omega Type K thermocouples (Omega Engineering, Stamford, Conn.) were attached to the external surface of the desiccant and to the inside of the container so that the temperature of the center of the internal cavity within the container is measured. The third thermocouple recorded the ambient temperature of the room in which the experiment was being conducted. Data measurements were recorded every 30 seconds for Size B cooling devices and every 5 minutes for Size A cooling devices, beginning about 10 seconds before the water reservoir(s) was punctured. Measurement continued until the internal box temperature and the desiccant temperature were approximately equal.

EXAMPLE 1

Cooling Device with Longest Cooling Time

Figure 14:
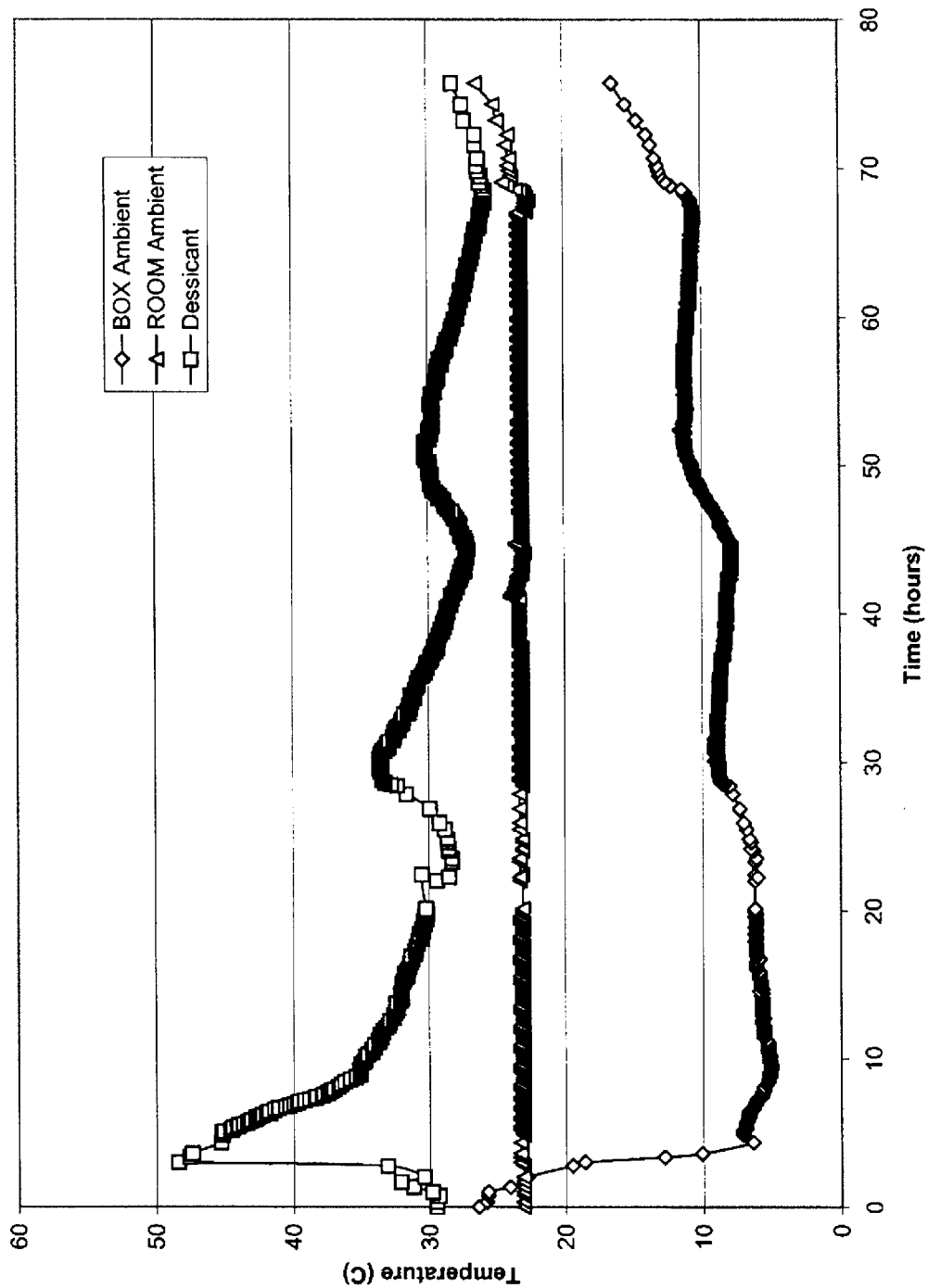
FIG. 14 illustrates the cooling properties of a sorption cooling device disposed in a shipping container according to an embodiment of the present invention.

Example 1 was a Size A cooling device with 400 grams of desiccant and 200 milliliters of water in the slow feed water reservoir. This cooling device also had two layers of wicking material, instead of one. The cooling device was tested in a VIP container and the results are illustrated in FIG. 14.

This container had the best performance of the Examples tested. As illustrated in FIG. 14, the temperature of the cavity dropped from about 26° C. to about 6° C. and the temperature did not rise above 10° C. for at least 48 hours.

EXAMPLE 2

Effect of Starter Reservoir on Performance

Figure 15:
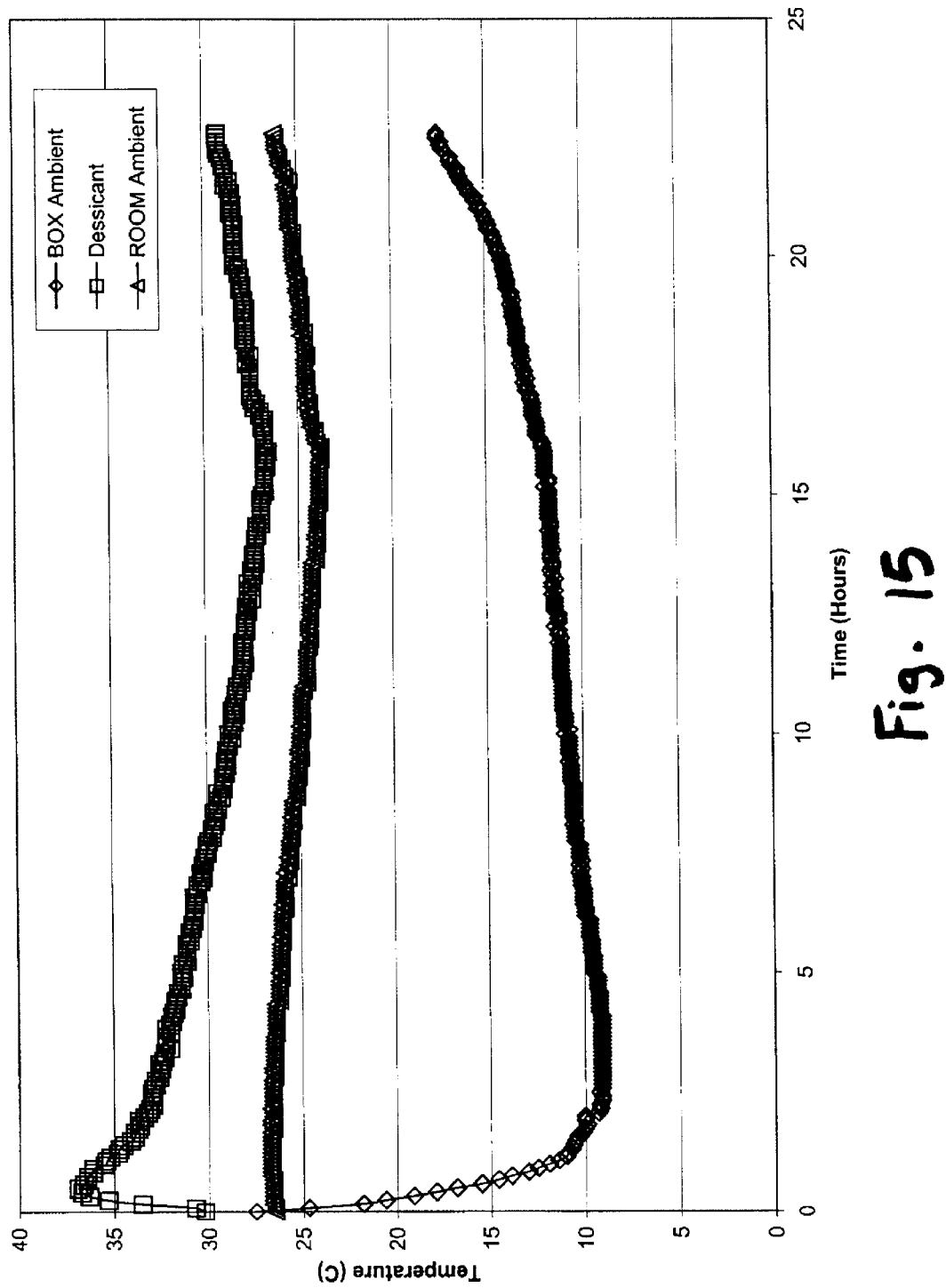
FIG. 15 illustrates the cooling properties of a sorption cooling device disposed in a shipping container according to an embodiment of the present invention.
Figure 16:
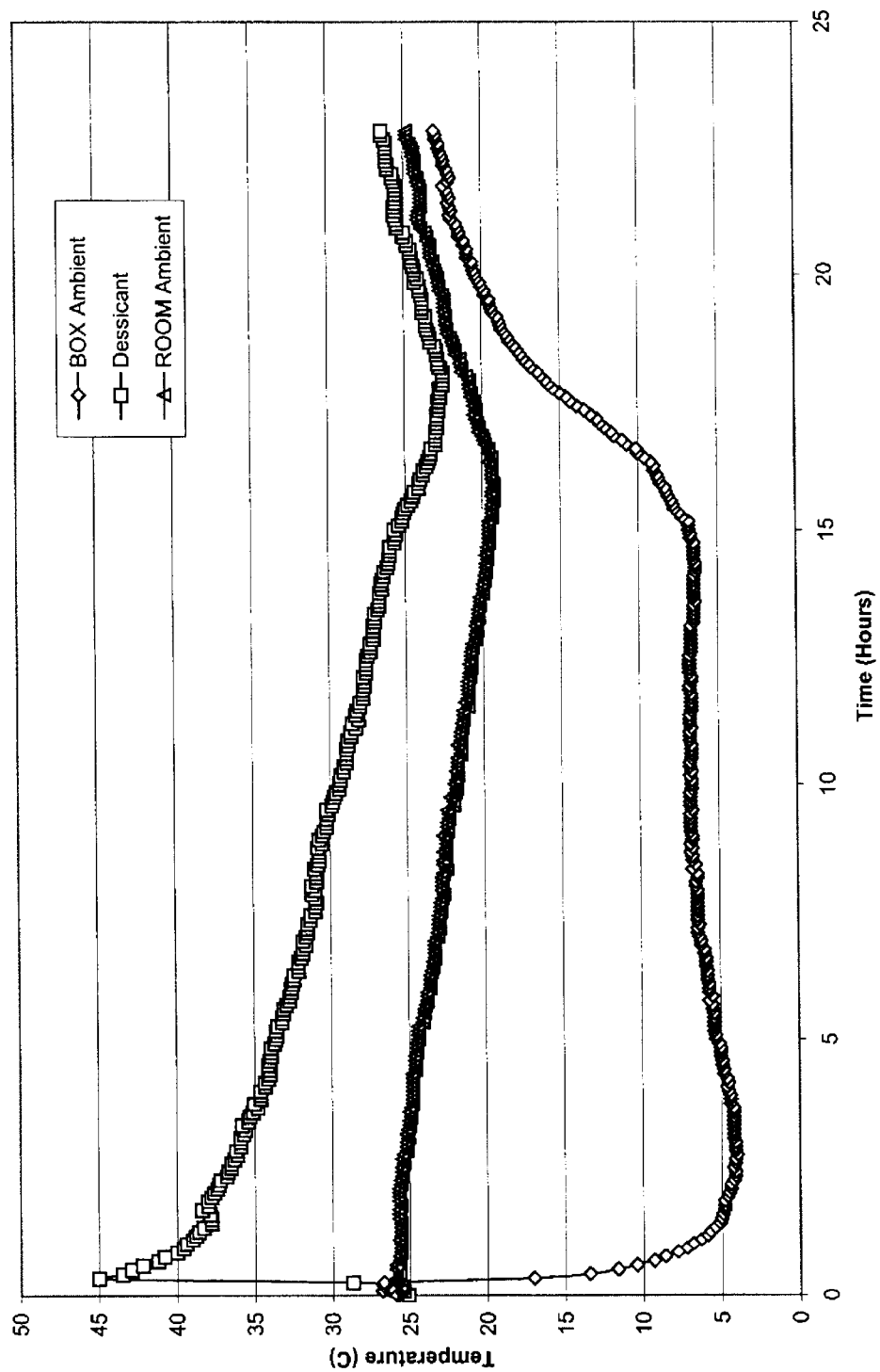
FIG. 16 illustrates the cooling properties of a sorption cooling device disposed in a shipping container according to an embodiment of the present invention.

Two Size A cooling devices were assembled so that they were identical to each other except that Example 2A did not have a starter liquid reservoir and Example 2B utilized the starter reservoir. Both were tested in VIP containers. The results for Example 2A are illustrated in FIG. 15 and the results for Example 2B are illustrated in FIG. 16. It can be seen that Example 2B exhibited a rapid drop to less than 5° C., whereas Example 2A dropped to slightly less than 10° C., demonstrating the effectiveness of utilizing a starter liquid reservoir.

EXAMPLE 3

EPS Container vs. VIP Container

Figure 17:
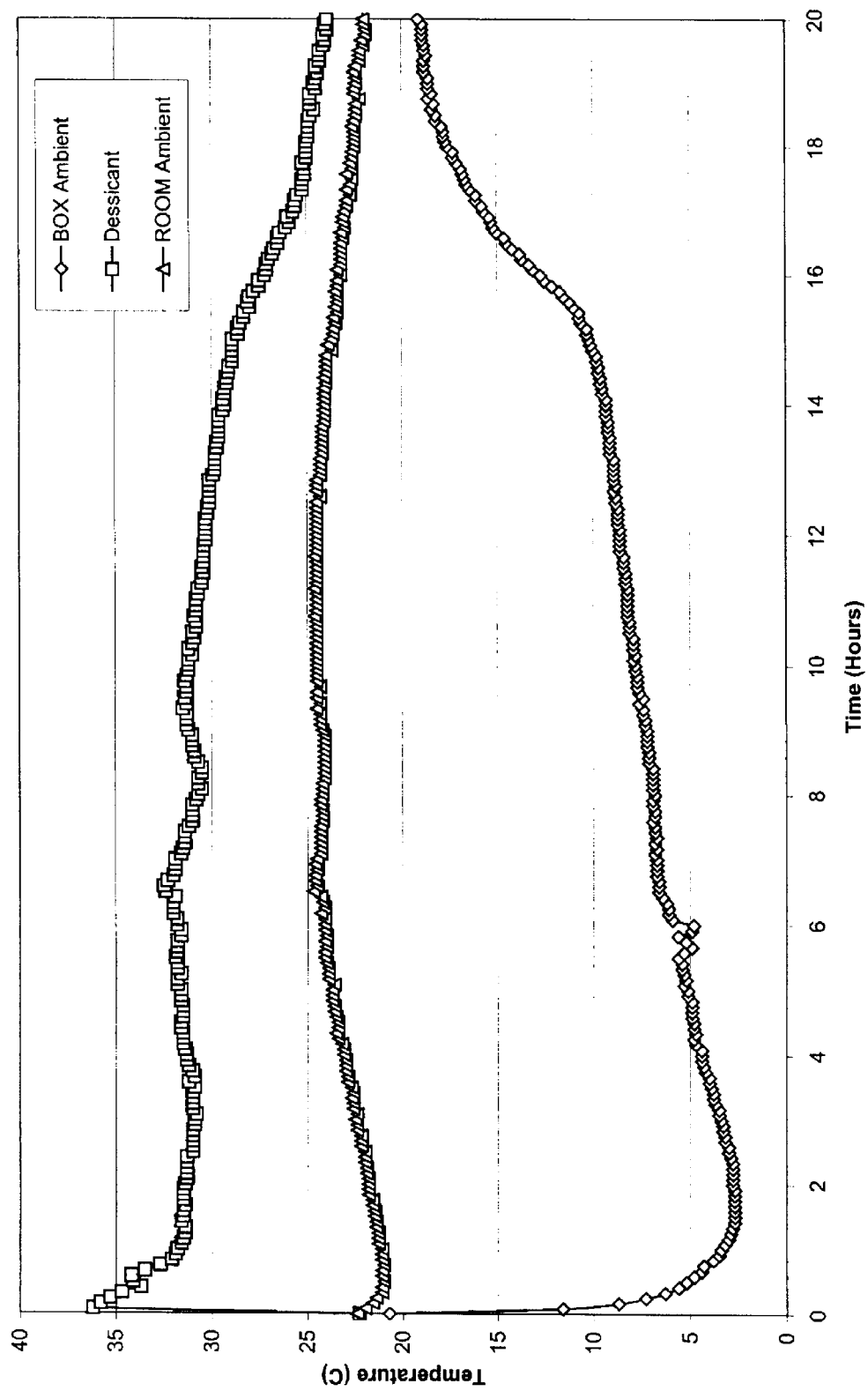
FIG. 17 illustrates the cooling properties of a sorption cooling device disposed in a shipping container according to an embodiment of the present invention.
Figure 18:
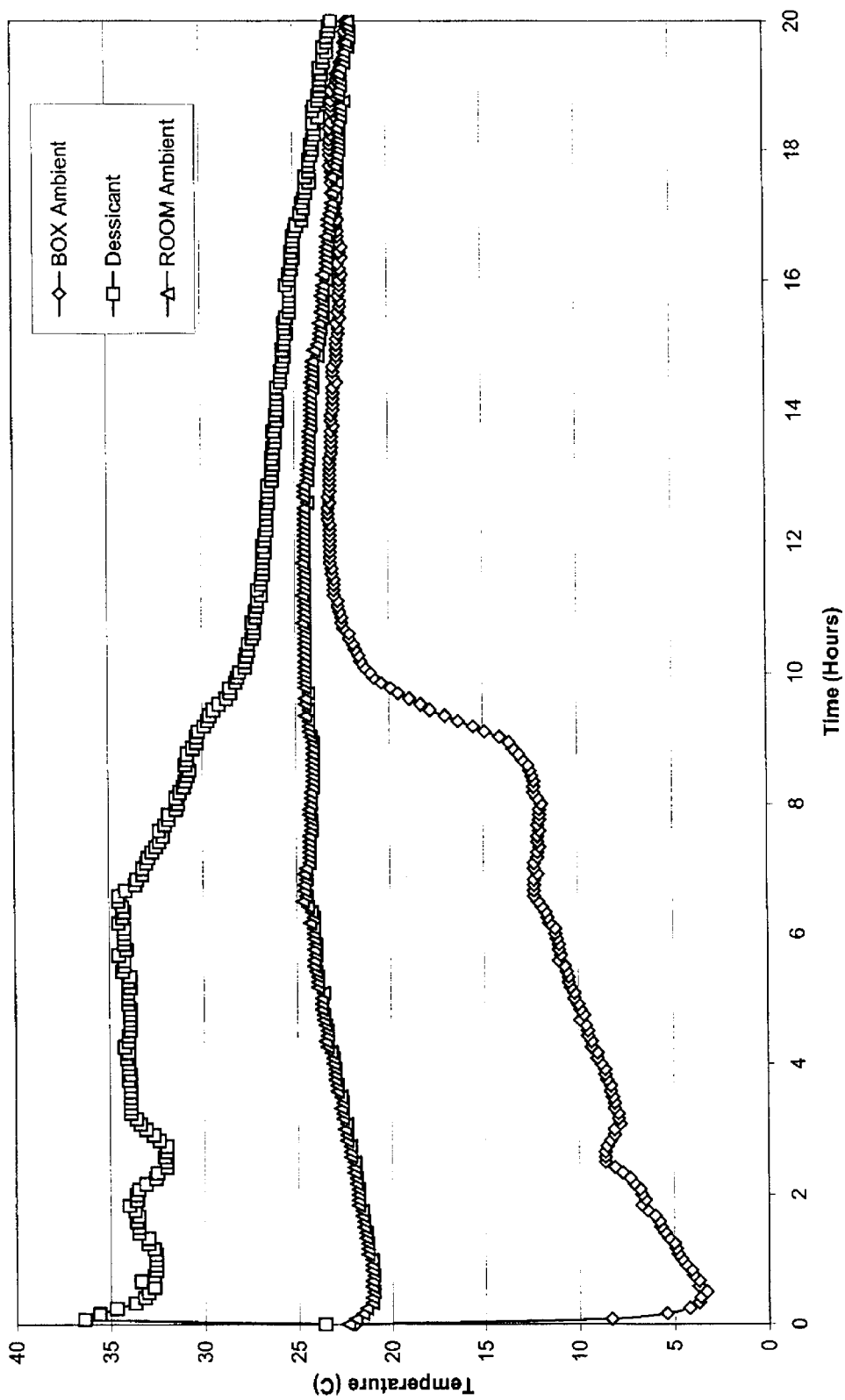
FIG. 18 illustrates the cooling properties of a sorption cooling device disposed in a shipping container according to an embodiment of the present invention.

Two identical Size A cooling devices were assembled. One (Example 3A) was tested in an EPS container and the other (Example 3B) was tested in a VIP container. The results for Example 3B are illustrated in FIG. 17 and the results for Example 3A are illustrated in FIG. 18.

As expected, the VIP container produced better results due to the improved thermal insulation properties of the VIP panels.

EXAMPLE 4

Effect of Different Size Containers

Two identical Size B cooling devices were assembled, however one was tested in a VIP container as described above (Example 4A) and the other cooling device was tested in smaller sized VIP container (Example 4B). The smaller VIP container had dimensions of 1" deep×5" wide×6" long and was constructed using VIP panels ¼" thick.

Figure 19:
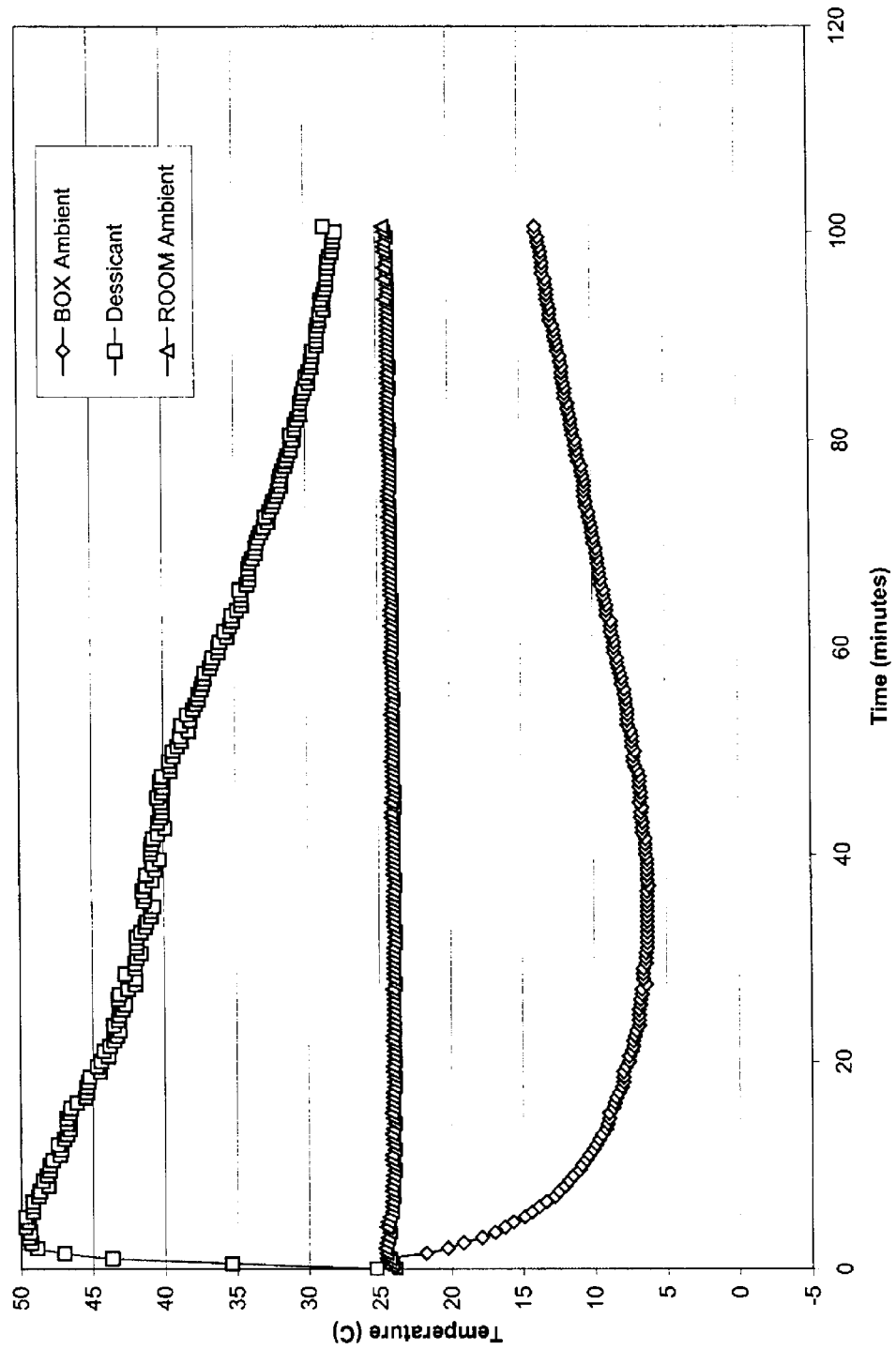
FIG. 19 illustrates the cooling properties of a sorption cooling device disposed in a shipping container according to an embodiment of the present invention.
Figure 20:
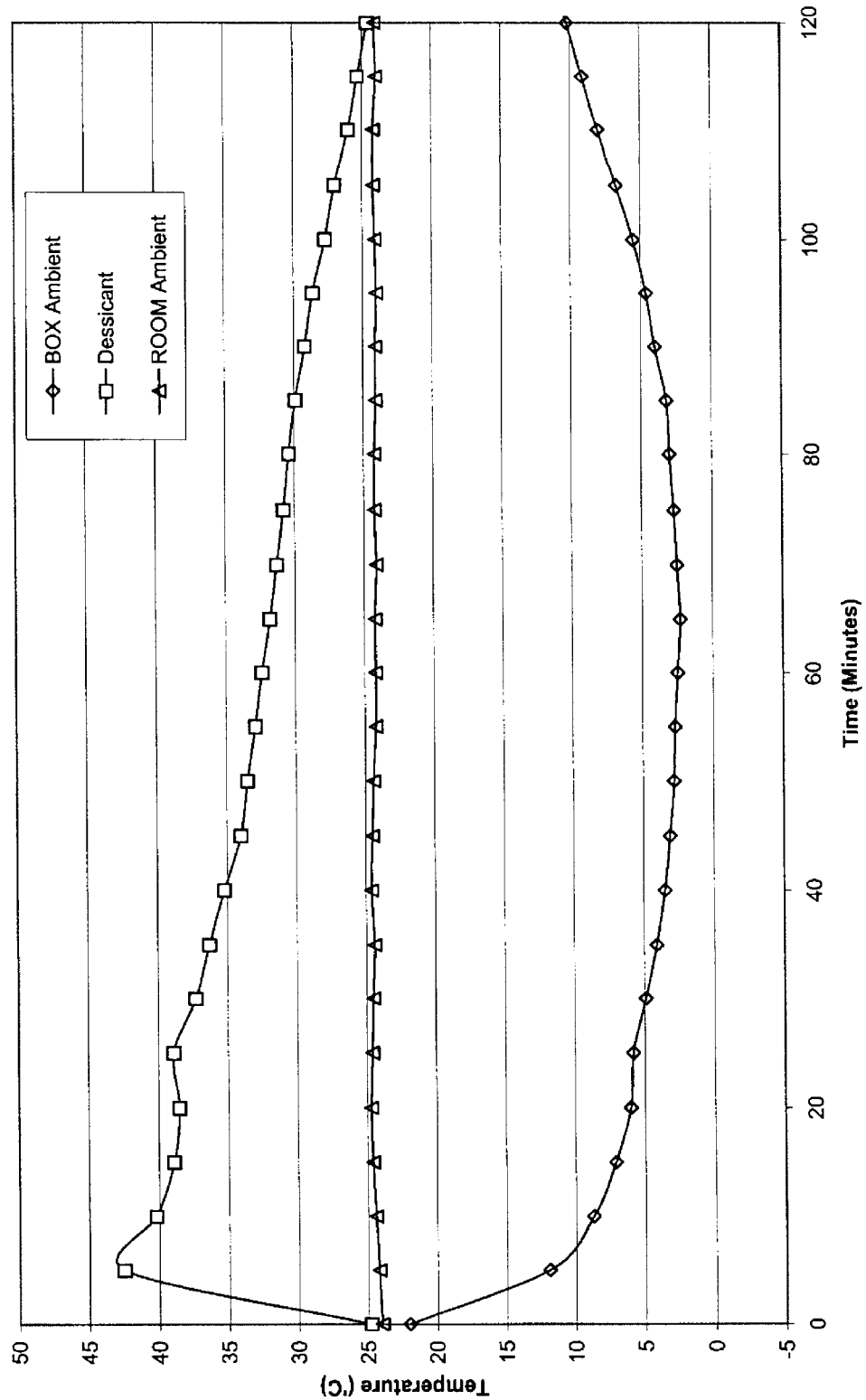
FIG. 20 illustrates the cooling properties of a sorption cooling device disposed in a shipping container according to an embodiment of the present invention.

The results for Example 4A are illustrated in FIG. 19 and the results for Example 4B are illustrated in FIG. 20.

EXAMPLE 5

Different Types of Desiccant

Two identical Size B cooling devices were assembled, but Example 5A contained 25 grams of ¹⁄₁₆" Molecular Sieve (EM Science Company, Gibbstown, N.J.) and Example 5B (same as example 4B) included the composite desiccant as described above.

Figure 21:
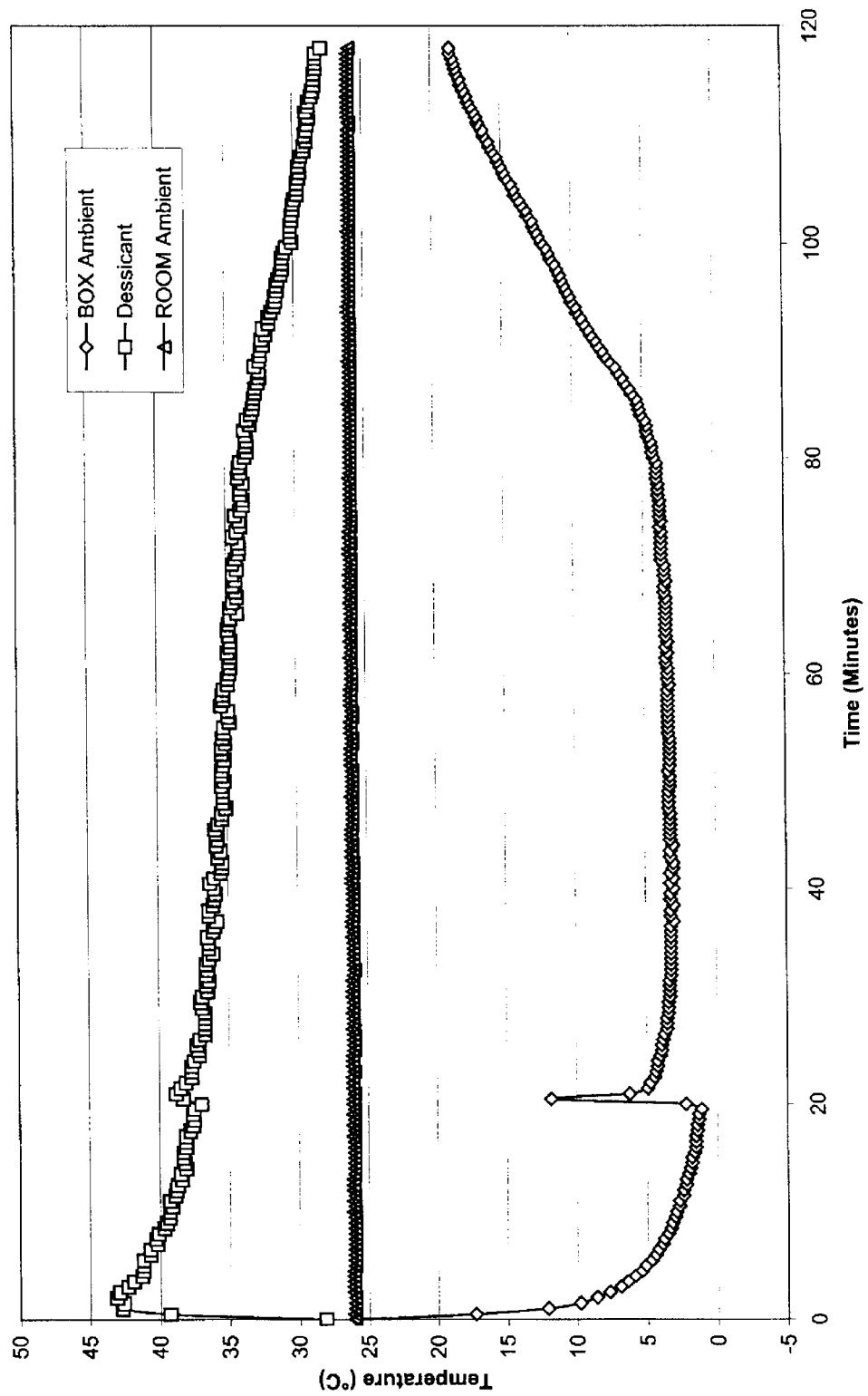
FIG. 21 illustrates the cooling properties of a sorption cooling device disposed in a shipping container according to an embodiment of the present invention.

The results for Example 5A are illustrated in FIG. 21 and the results for Example 5B are illustrated in FIG. 20.

EXAMPLE 6

Varying Internal Pressure of Cooling Devices

Figure 22:
FIG. 22 illustrates the cooling properties of sorption cooling devices according to an embodiment of the present invention that have different operating pressures.

Five identical cooling devices were assembled, except that each cooling device was evacuated to a different internal pressure. All five cooling devices were Size B and were assembled per the foregoing description. The results are illiustrated in FIG. 22. As expected, the best results were obtained at the lowest pressures.

While various embodiments of the present invention have been described in detail, is apparent that modifications and adaptations of those embodiments will occur to those skilled in the art. However, is to be expressly understood that such modifications and adaptations are within the spirit and scope of present invention.

What is claimed is:

1. A sorption cooling device, comprising:
   a) an evaporator;
   b) an absorber;
   c) at least a first reservoir adapted to contain a liquid;
   d) a liquid disposed in said first reservoir; and
   e) flow restriction means disposed between said liquid and said evaporator for restricting the flow of said liquid to said evaporator, wherein said flow restriction means comprises a porous membrane.

2. A sorption cooling device as recited in claim 1, wherein said porous membrane is disposed within said first reservoir.

3. A sorption cooling device as recited in claim 1, wherein said porous membrane substantially encloses said first reservoir.

4. A sorption cooling device as recited in claim 1, wherein said liquid is water.

5. A sorption cooling device as recited in claim 1, wherein said porous membrane has an average pore size of from about 0.05 $\mu$m to about 20 $\mu$m.

6. A controlled-temperature shipping container incorporating a sorption cooling device as recited in claim 1.

7. A sorption cooling device as recited in claim 1, wherein the flow rate of said liquid to said evaporator is substantially constant during the operation of the sorption cooling device.

8. A sorption cooling device, comprising:
   a) an evaporator;
   b) an absorber;
   c) at least a first reservoir adapted to contain a liquid;
   d) a liquid disposed in said first reservoir; and
   e) flow restriction means disposed between said liquid and said evaporator for restricting the flow of said liquid to said evaporator, wherein said flow restriction means comprises at least one aperture in said first reservoir.

9. A sorption cooling device as recited in claim 8, wherein the flow rate of said liquid to said evaporator is substantially constant during the operation of the sorption cooling device.

10. A controlled-temperature shipping container incorporating a sorption cooling device as recited in claim 8.

11. A sorption cooling device, comprising:
   a) an evaporator;
   b) an absorber;
   c) at least a first reservoir adapted to contain a liquid;
   d) a liquid disposed in said first reservoir; and
   e) flow restriction means disposed between said liquid and said evaporator for restricting the flow of said liquid to said evaporator, wherein said flow restriction means comprises at least a first capillary tube, said capillary tube having a diameter of from about 20 $\mu$m to about 100 $\mu$m.

12. A sorption cooling device as recited in claim 11, wherein the flow rate of said liquid to said evaporator is substantially constant during the operation of the sorption cooling device.

13. A controlled-temperature shipping container incorporating a sorption cooling device as recited in claim 11.

* * * * *

UNITED STATES PATENT AND TRADEMARK OFFICE
CERTIFICATE OF CORRECTION

PATENT NO. : 6,688,132 B2
DATED : February 10, 2004
INVENTOR(S) : Smith et al.

It is certified that error appears in the above-identified patent and that said Letters Patent is hereby corrected as shown below:

<u>Column 10,</u>
Line 26, delete the word "dessicant", and insert therefor -- desiccant --.

<u>Column 15,</u>
Lines 24, 31 and 33, delete the word "dessicant", and insert therefor -- desiccant --.

<u>Column 16,</u>
Line 19, delete the word "guage", and insert therefor -- gauge --.

<u>Column 17,</u>
Line 34, delete the word "dessicant", and insert therefor -- desiccant --;
Line 55, delete the word "polyester-polyethelene", and insert therefor -- polyester-polyethylene --;
Line 61, delete the second occurrence of "and".

<u>Column 19,</u>
Line 54, delete the word "illiustrated", and insert therefor -- illustrated --.

Signed and Sealed this

Fifteenth Day of June, 2004

JON W. DUDAS
*Acting Director of the United States Patent and Trademark Office*